US012038069B2

(12) United States Patent
Erickson

(10) Patent No.: US 12,038,069 B2
(45) Date of Patent: Jul. 16, 2024

(54) MECHANICAL LINEAR ACTUATORS

(71) Applicant: Carl Erickson, Toronto (CA)

(72) Inventor: Carl Erickson, Toronto (CA)

(73) Assignee: Carl Erickson, Toronto (CA)

( * ) Notice: Subject to any disclaimer, the term of this patent is extended or adjusted under 35 U.S.C. 154(b) by 755 days.

(21) Appl. No.: 17/058,953

(22) PCT Filed: May 30, 2018

(86) PCT No.: PCT/IB2018/053825
§ 371 (c)(1),
(2) Date: Nov. 25, 2020

(87) PCT Pub. No.: WO2018/220536
PCT Pub. Date: Dec. 6, 2018

(65) Prior Publication Data
US 2021/0214203 A1 Jul. 15, 2021

(51) Int. Cl.
*F16H 19/06* (2006.01)
*B66F 11/00* (2006.01)

(52) U.S. Cl.
CPC .............. *F16H 19/06* (2013.01); *B66F 11/00* (2013.01); *F16H 19/0618* (2013.01); *F16H 19/0663* (2013.01); *F16H 2019/0613* (2013.01)

(58) Field of Classification Search
CPC .. F16H 19/06; F16H 19/0636; F16H 19/0645; F16H 19/0663; F16H 19/0618; B25J 18/02; B66F 11/00
See application file for complete search history.

(56) References Cited

U.S. PATENT DOCUMENTS

| 3,783,908 | A | * | 1/1974 | Stump | B29C 53/581 |
| | | | | | 138/144 |
| 4,875,660 | A | * | 10/1989 | Gagnon | B66F 7/10 |
| | | | | | 254/89 R |
| 5,249,396 | A | * | 10/1993 | Zuse | E04H 12/185 |
| | | | | | 52/118 |
| 6,547,216 | B1 | * | 4/2003 | Bouchard | B66F 13/005 |
| | | | | | 254/89 R |
| 8,544,504 | B2 | | 10/2013 | Castro | |
| 10,050,342 | B1 | * | 8/2018 | Hall | H01Q 3/06 |
| 2006/0005651 | A1 | * | 1/2006 | Laforest | B66F 11/00 |
| | | | | | 74/425 |
| 2006/0261207 | A1 | | 11/2006 | Woodruff et al. | |
| 2015/0007902 | A1 | | 1/2015 | Ragner | |

(Continued)

FOREIGN PATENT DOCUMENTS

JP 4607772 B2 * 1/2011
WO 2014074921 A1 5/2014

OTHER PUBLICATIONS

JP 4607772 B2 (Yoshida) May 1, 2011 (full text). [online] [retrieved on Sep. 20, 2023]. Retrieved from: Clarivate Analytics. (Year: 2011).*

(Continued)

*Primary Examiner* — Joseph Brown
(74) *Attorney, Agent, or Firm* — JCIP; Joseph G. Chu; Jeremy I. Maynard

(57) ABSTRACT

The present invention relates to a linear actuator comprised of a tube and method of deploying 3 spools of strips into a tube by consolidating the strips in an overlapping condition with each other each in a helical form of a constant diameter.

17 Claims, 25 Drawing Sheets

(56) References Cited

U.S. PATENT DOCUMENTS

| | | |
|---|---|---|
| 2015/0041016 A1 | 2/2015 | Ragner |
| 2015/0354731 A1 | 12/2015 | Ragner |
| 2016/0030698 A1 | 2/2016 | Kolk et al. |
| 2017/0001314 A1* | 1/2017 | Yim .......................... B25J 18/02 |

OTHER PUBLICATIONS

International Search Report and Written Opinion of International Searching Authority for International Application No. PCT/IB2018/053825.

* cited by examiner

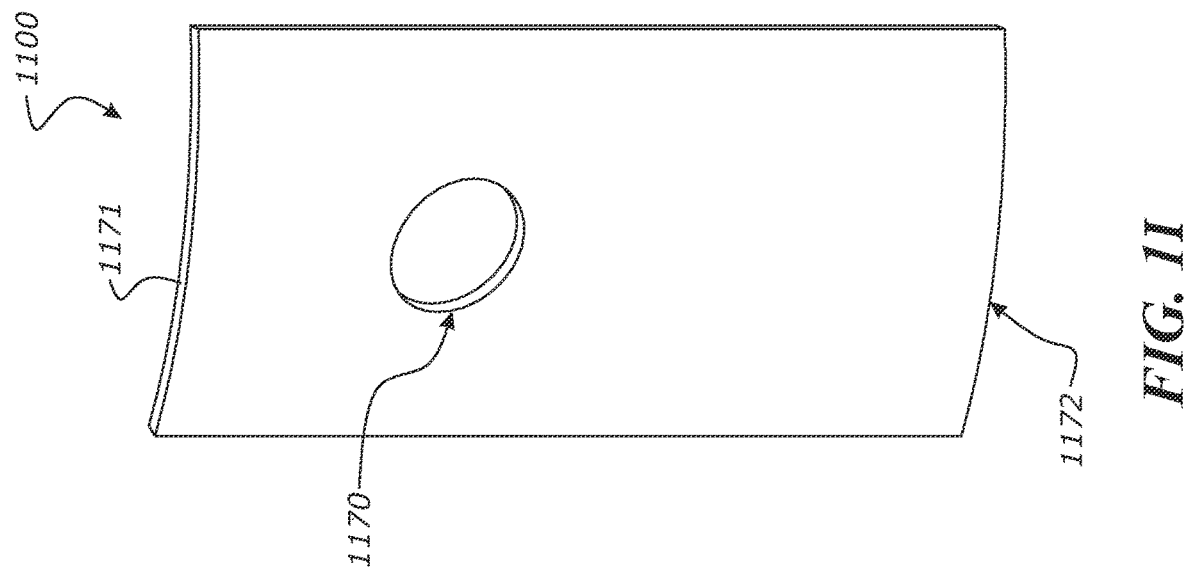
FIG. 1I
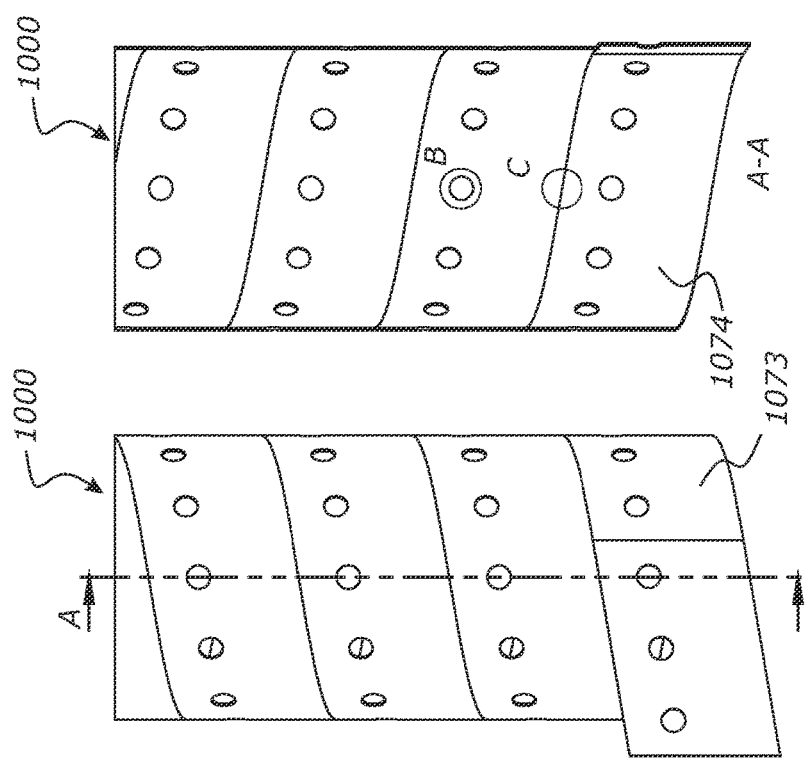
FIG. 1E
FIG. 1F
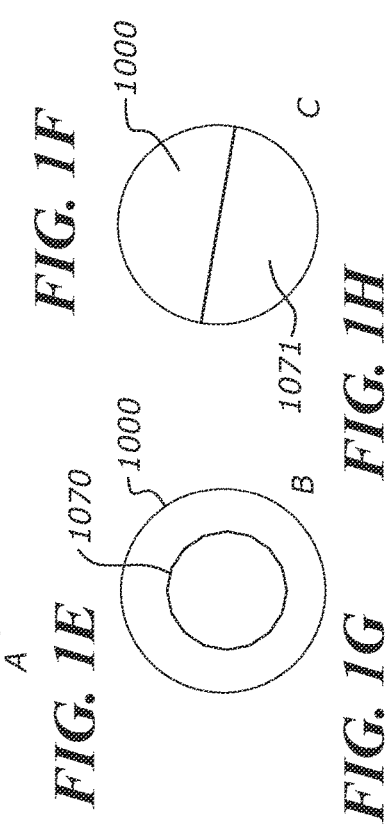
FIG. 1G
FIG. 1H

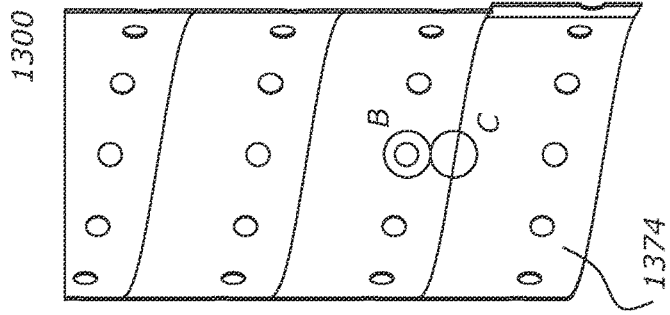
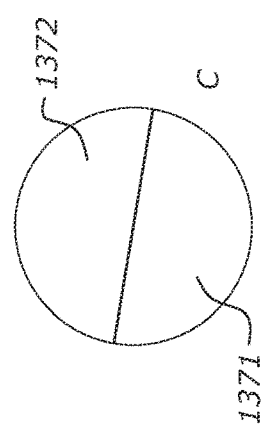
FIG. 1M
FIG. 1O
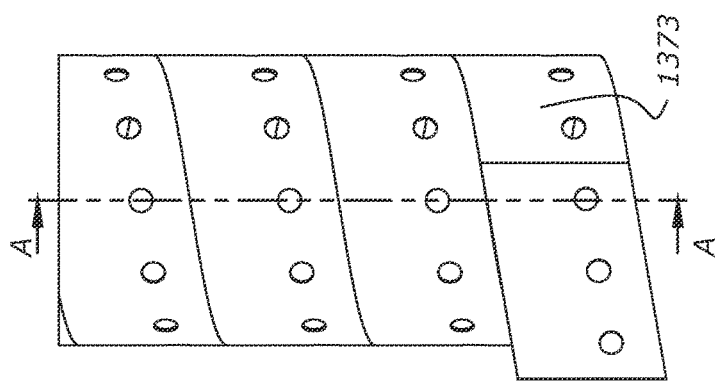
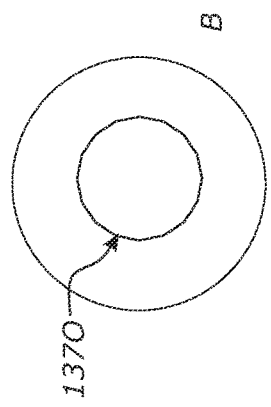
FIG. 1L
FIG. 1N
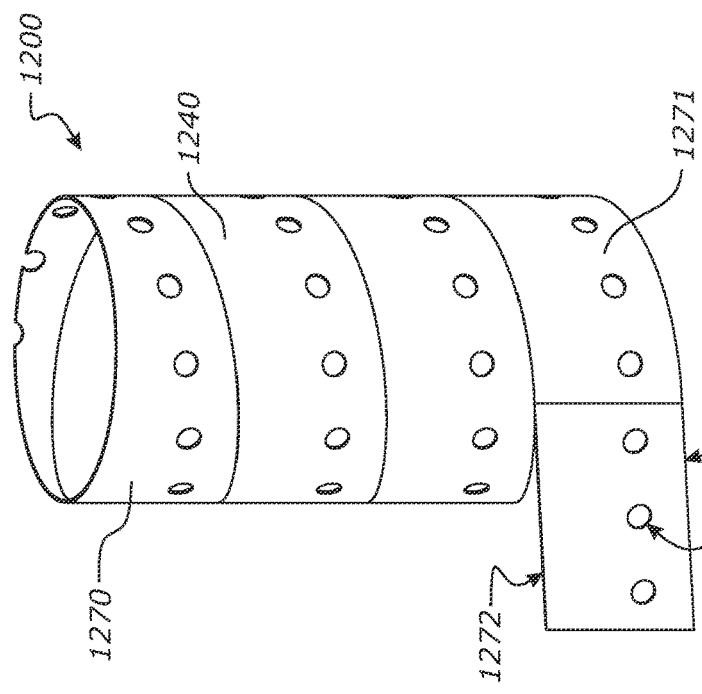
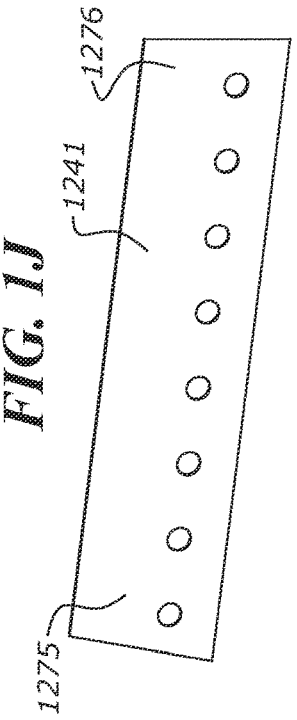
FIG. 1J
FIG. 1K

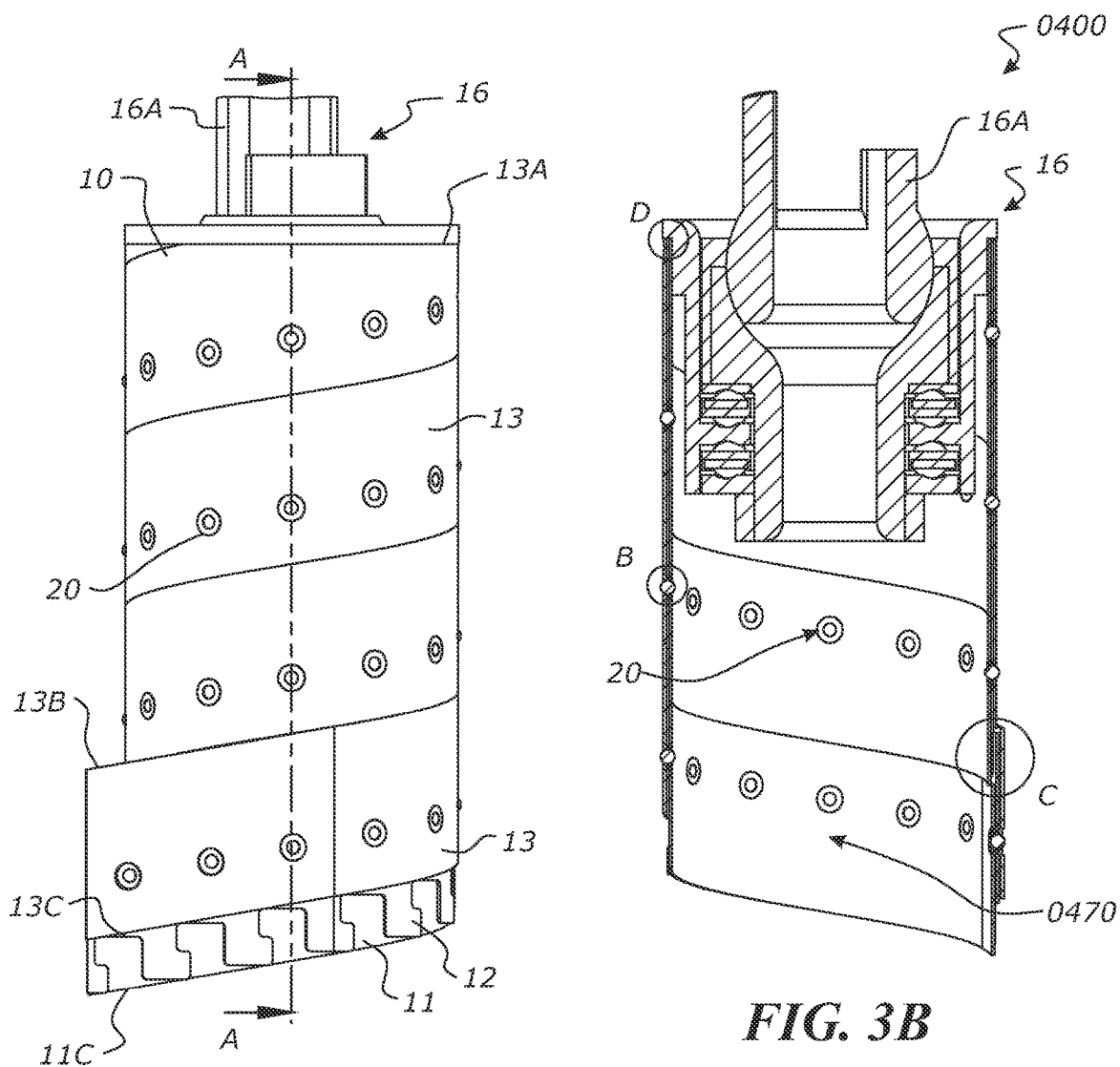
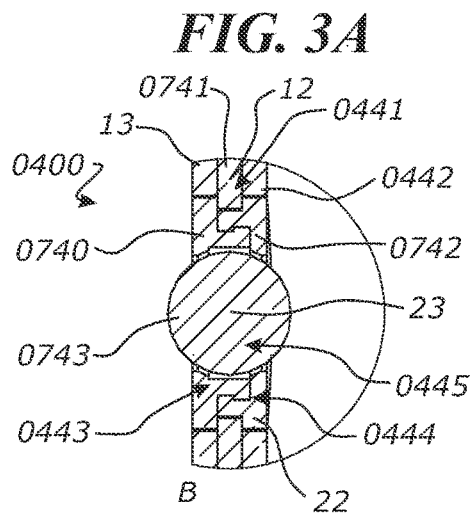
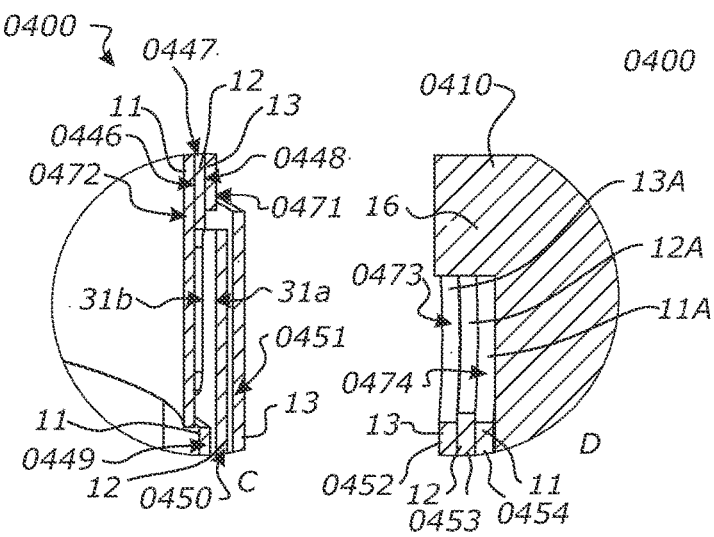
FIG. 3A  FIG. 3C  FIG. 3D  FIG. 3E

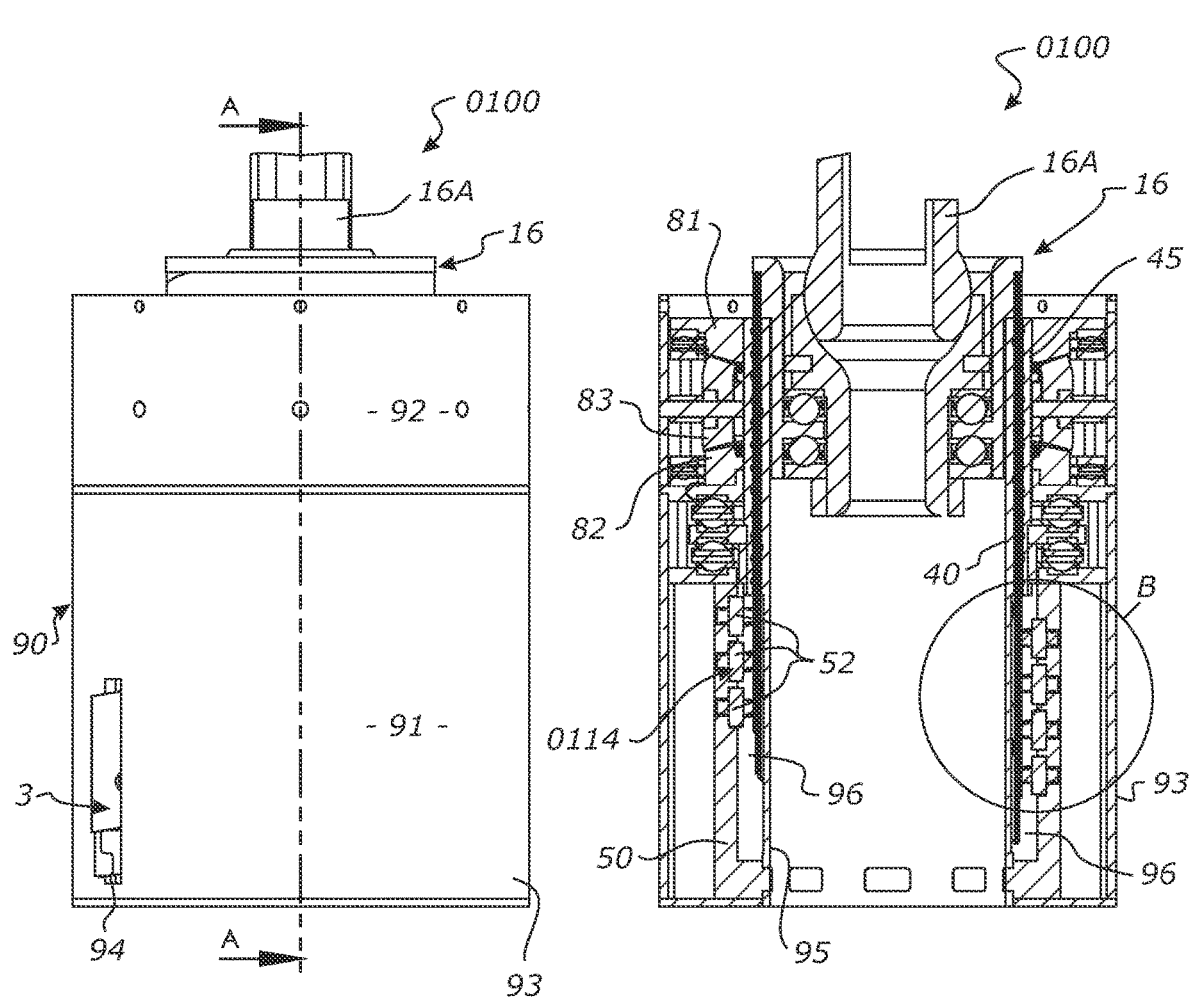
*FIG. 5*  *FIG. 6*
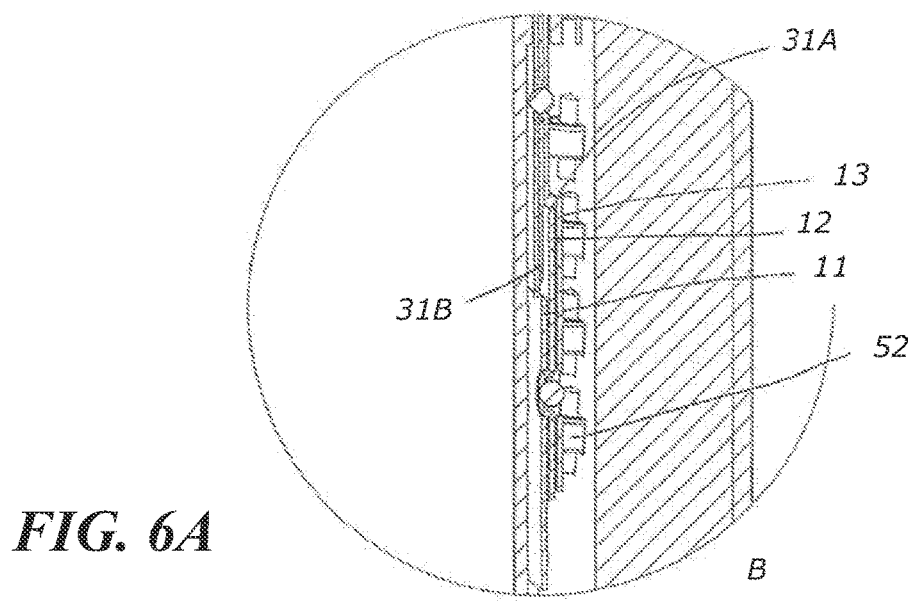
*FIG. 6A*

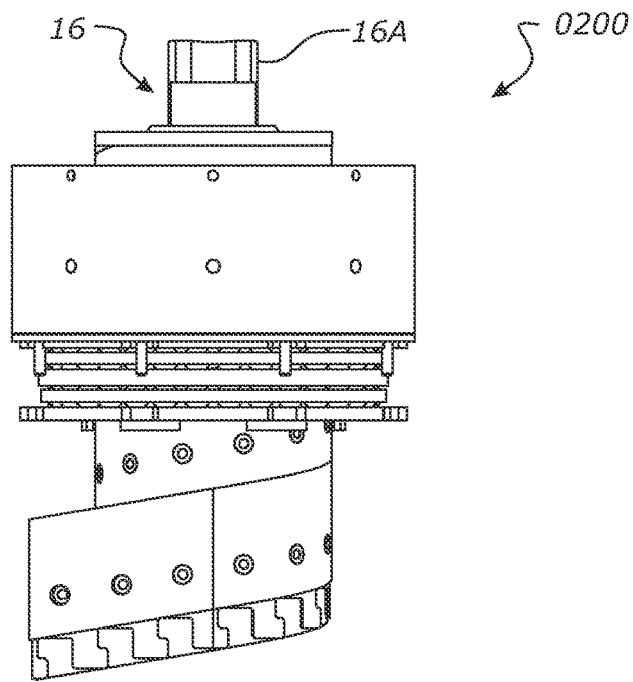
FIG. 7
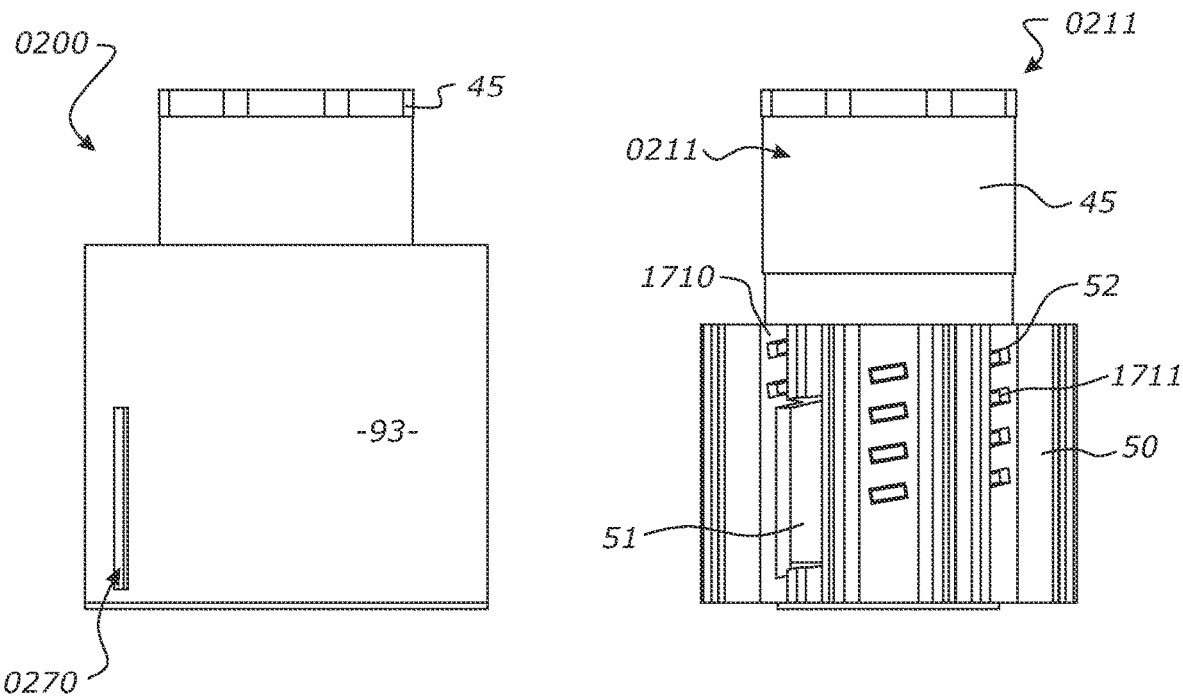
FIG. 8
FIG. 9

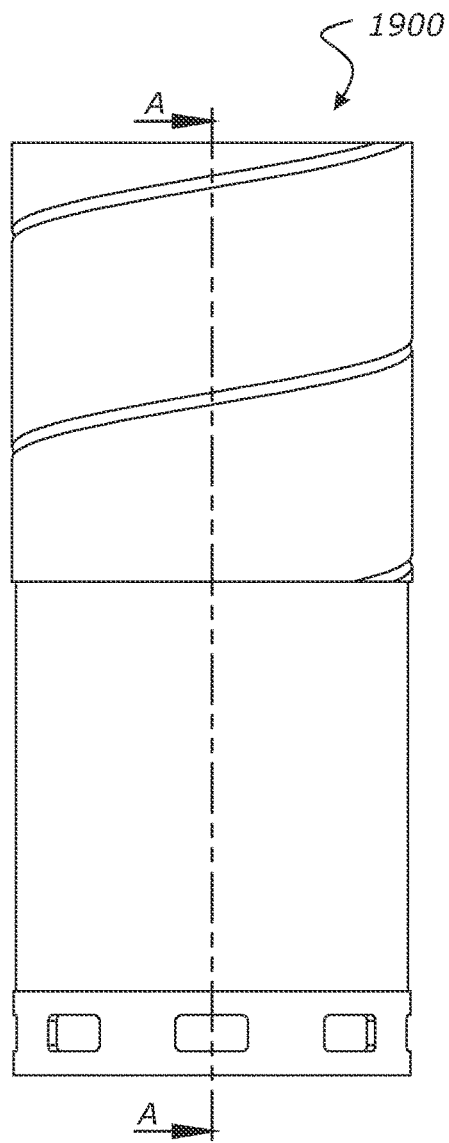 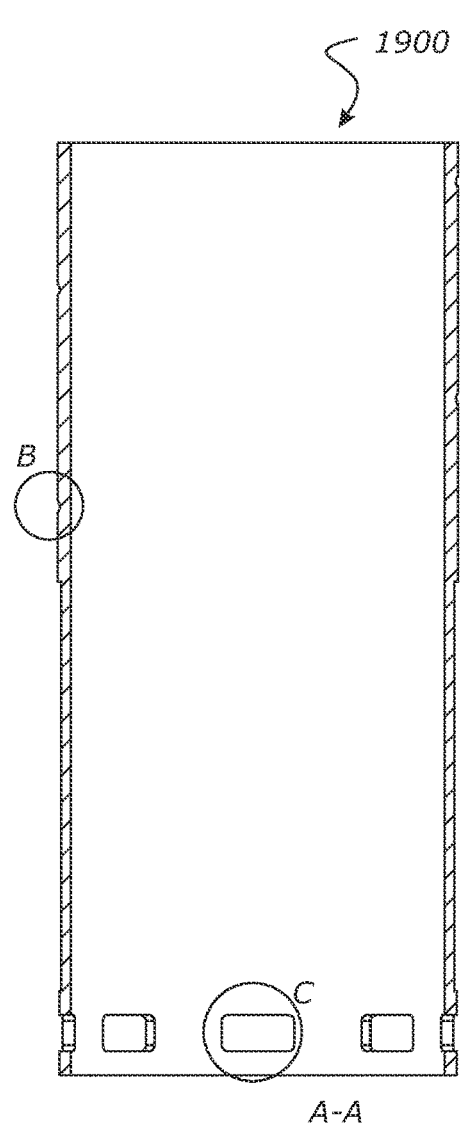
*FIG. 18A*      *FIG. 18B*
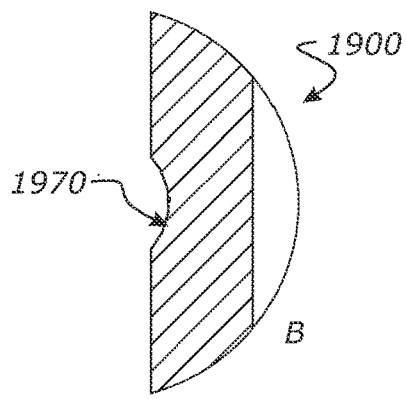 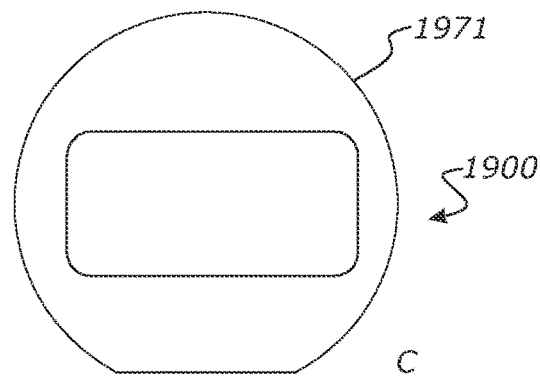
*FIG. 18C*      *FIG. 18D*

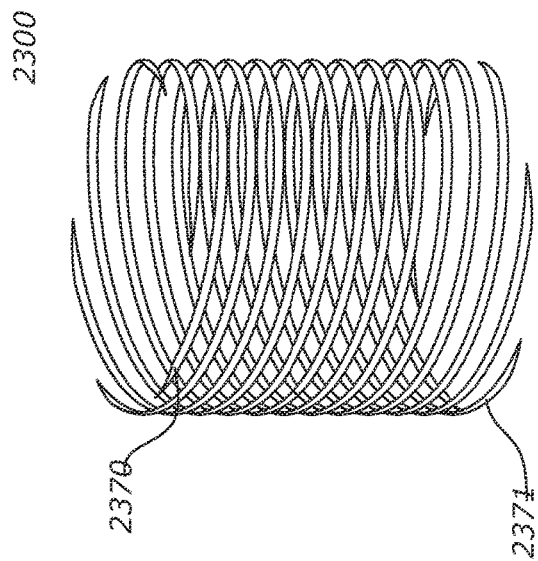
FIG. 19F
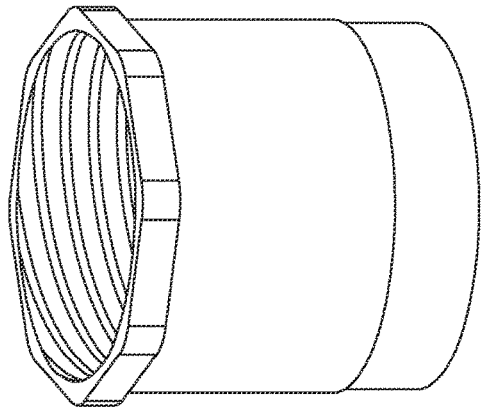
FIG. 19G
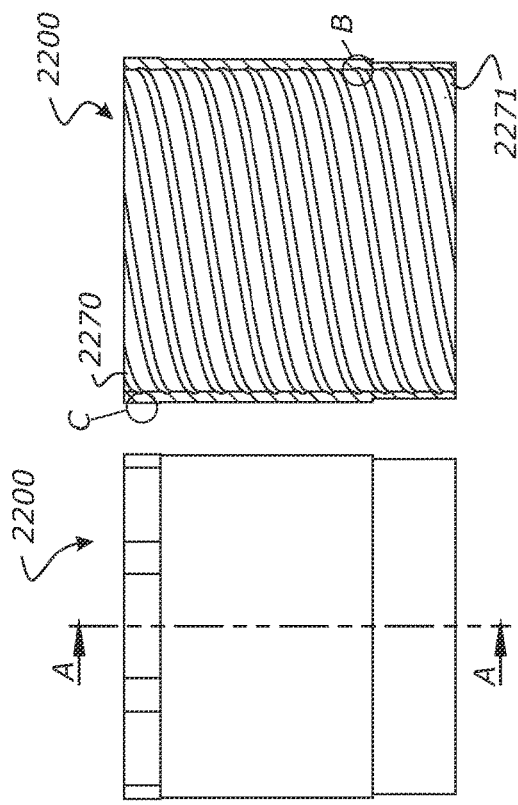
FIG. 19C
FIG. 19E
FIG. 19B
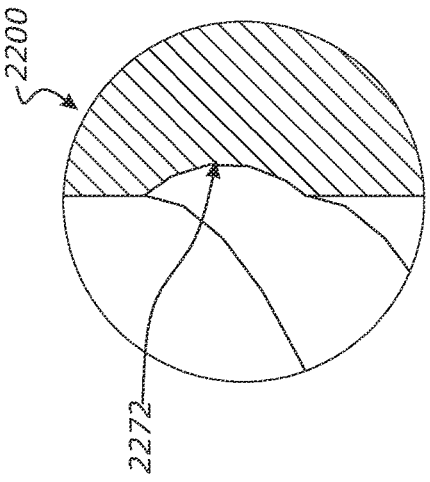
FIG. 19D

MECHANICAL LINEAR ACTUATORS

FIELD OF INVENTION

This invention relates to mechanical linear actuators.

BACKGROUND AND RELATED ART

Linear actuators are commonly used in engineering design. Common types of linear actuator include pistons, screw-drives, and lever arrays such as scissor jacks. Another type of linear actuator makes use of compactly stored flexible material from which an actuation column is constructed. US 2006/0005651 is an example of this. This "construction mode" actuator offer greater extension ratios than many rigid bodied counterparts.

As seen in US 2006/0005651 a strip is retrieved from a spool and is bent along a helical trajectory to form a tubular column. The temporary joining of strip material is accomplished by inserting tabs of an inner band into overlapping slot pairs in the strip. Though an effective technique, the strip must be strength compensated (thickened) to withstand acute load forces applied to its slots which may undermine overall structural efficiency. An increase in strip thickness means that the strip is not able to be spooled in a tighter form or constructed at a smaller diameter than if the material were thinner, without causing the strip to yield bend and plastically deform rather than resiliently and flexibly form and deform to/from its column form. In addition, axial load transfer in the column of US '651 is reliant on tab strength. Further minimum thickness constraints are imposed on the tabbed inner band by the cam-roller mechanism used to propel it. Because the strip wraps around itself to form a column the base diameter of the column constantly increases as the column extends. This is in many applications a disadvantage because the drive mechanism must be built to accommodate a wide range of column diameters.

Another construction mode actuator is called a Zipper Mast (zippermast.com) and forms a triangular column from three separately spooled webs. US20060261207 is representative of this concept. Each web has contoured edges that allow it to interlock with the other two. With the relatively small contact area inherent of this edge-crossing-edge interlocking scheme, strict minimum thickness limitations apply. This again limits the spool diameter of the webs in order to avoid plastic yield bending of the webs. Also, the rigidity of the column is limited by the fact that the webs forming it are in un-tensioned contact. This may result in significant backlash.

It is an object of the present invention to provide a mechanical linear actuator that overcomes as least some of the above mentioned disadvantages and/or which will at least provide the public with a useful choice.

SUMMARY OF INVENTION

The invention herein disclosed embodies a reversible method for constructing a tube having a multi-ply wall made from flexible strips. The tube constructed is desirably of a constant inside and outside diameter. It preferably does not involve the use of a separate locking member to lock the flexible strips to each other. It can take considerable load and is constructed in cylindrical and non-tapering form along its length. The interlocking strips can be assembled/disassembled by hand or more preferably can transition through assembler/disassembler to be assembled/disassembled. In its basic form the assembler/disassembler when assembling the tube may receive the strips in a lead-in/lead out portion where the strips are bent towards a tubular form and consolidated together before a leading-to-trailing edge keying of one of the strips occurs. The assembler/disassembler may further include a guide member to set the helical angle at which the strips transition through the assembler/disassembler and optionally a drive member to cause the strips to be driven by the assembler/disassembler for assembly to and disassembly from the tubular form. In this manner the assembler/disassembler and strips can offer the functionality of a linear actuator. The present invention allows for a tube to be constructed that is of a high strength to weight ratio, is scalable and is not expensive to manufacture and for such a tube to be deconstructed and for its component parts to be conveniently stored.

In one aspect the present invention may be said to be an extendable tube comprising:

a strip ('core strip') able to be caused to progressively deploy from an at least substantially stowed format and into, or undeploy to its at least substantially stowed format from, a helical tubular form, and at least one of:
  (i) an outer strip able to be caused, as the core strip deploys or undeploys, to progressively deploy from an at least substantially stowed format and into, or undeploy to its at least substantially stowed format from, a helical tubular form about the tubular form of the core strip and when deployed to anchor with said core strip and lay over and about one edge to edge contact or proximate region of the core strip of the tubular form of the core strip, and
  (ii) an inner strip able to be caused, as the core strip deploys or undeploys, to progressively deploy from an at least substantially stowed format and into, or undeploy to its at least substantially stowed format from, a helical tubular form within the tubular form of the core strip and when deployed to anchor with said core strip and to lay over and within the other edge to edge contact or proximate region of the core strip of the tubular form of the core strip.

Preferably option (i) is present.

Preferably option (ii) is present.

Preferably the inner and/or outer strip progressively during deployment, anchor to the core strip and during undeployment de-anchor from the core strip.

Preferably the core strip contacts edge to edge upon deployment into the helical form.

Preferably the tube is able to bear, at least in part, a load longitudinally of its tubular form and at a height determined by the state of deployment/undeployment.

Preferably the core strip is elongate and has two parallel elongate edges (profiled or straight).

Preferably the inner strip is elongate and has two parallel elongate edges (profiled or straight).

Preferably the outer strip is elongate and has two parallel elongate edges (profiled or straight).

Preferably the width of the core strip is the same as the width of the inner and outer strips.

Preferably the width of the core strip is greater than the width of the inner and outer strips.

Preferably a first of said edges of the core strip, when being deployed is the lead edge and the other of said edges of the core strip is the trailing edge, wherein when in the helical tubular form, the leading edge of a winding of the core strip is in edge to edge abutment with a trailing edge of the next winding of the core strip that is in a more advanced deployed state.

Preferably the outer strip envelops the core strip when in the deployed and tubular form.

Preferably the core strip is in direct overlay contact with the inner strip when in their tubular form and the outer strip is in direct overlay contact with the core strip when in their tubular form.

Preferably the edge to edge contact of the core strip is of straight edges of the core strip.

Preferably the contact is an interlacing contact.

Preferably the leading edge of the core strip is profiled to be able to key with a complementary shaped trailing edge of the core strip.

Preferably the profile shapes of the leading and trailing edges of the core strip are such as to prevent edge to edge slip in a direction tangential to the tubular form.

Preferably the leading and trailing edges of the core strips are of a profile to tesellate together.

Preferably the leading and trailing edges of the outer strip are straight.

Preferably the leading and trailing edges of the inner strip are straight.

Preferably the leading edge of the inner strip is profiled to be able to key with a complementary shaped trailing edge of the inner strip.

Preferably all strips to deploy or undeploy come from or return to a common assembler/disassembler via which the strips transition between their stored and deployed state and during transition to be deployed through the assembler/disassembler are caused to assume the helical tubular forms by said assembler/disassembler.

Preferably all strips to deploy are in a spool form.

Preferably all strips to deploy are in a spool form separate from each other.

Preferably the strip deployment is by an assembler/disassembler via which the strips transition from their stored state to their deployed and state.

Preferably all the strips are deployed and undeployed from/to the assembler/disassembler simultaneously.

Preferably the assembler/disassembler, during strip deployment, causes the strips to be maneuvered into their helical form and be anchored together and for the edge to edge contact of the core strip to be established.

Preferably the assembler/disassembler, during strip undeployment, causes the strips to be maneuvered from their helical form and for the edge to edge contact of the core strip to be dis-established.

Preferably the tubular forms rotate during deployment/undeployment.

Preferably the tubular forms do not rotate during deployment/undeployment.

Preferably there is edgewise contact of the outer strip on itself when in the deployed state.

Preferably there is edgewise contact of the inner strip on itself when in the deployed state.

Preferably the core strip carries a plurality of spaced apart protrusions to anchor with the outer and/or inner strips.

Preferably the protrusions are in a row of said protrusions extending along the core strip and projecting from one or both major faces of the core strip.

Preferably each protrusion are each to engage into a complimentary shaped hole of a row of holes of one or each of the outer and/or inner strips to anchor the outer and/or inner strips with the core strip.

Preferably there is one row of protrusions carried by said core strip.

Preferably there are two rows of protrusions carried by said core strip.

Preferably the anchored relationship established between the core strip and the inner and/or outer strips prevent the core strip from rotating about the tubular axis relative the inner and/or outer strips.

Preferably the anchored relationship established between the core strip and the inner and/or outer strips prevent the core strip from axially sliding relative the inner and/or outer strips.

Preferably at least one of the core strip and inner strip and outer strip carries a plurality of spaced apart bearings presented for rolling contact at the inside and outside of the tube.

Preferably each bearing is located at or by a said protrusion.

Preferably the bearings are the radially most outward part of the extendable tube.

Preferably the bearings are the radially most inward part of the extendable tube.

Preferably each bearing is a ball bearing and is of a diameter larger than the combined thickness of the strips.

Preferably the ball bearings are carried by the core strip and project through apertures in the inner and outer strips when the tube is in its deployed state.

Preferably the bearings are spaced apart in a row long the core strip, the row assuming a helix when the core strip is in its tubular form.

Preferably the projections comprise a bearing cage by which a said ball bearing is held.

In a further aspect the present invention may be said to be an extendable tube able to be assembled to a tubular form and disassembled to a non-tubular stored condition, the tube comprising of three flexible strips namely:

a core strip able to be wound from the stored condition into (and back from) a tubular helical form and having a leading and trailing edge at where complementary shaped connector sections present a row of identical connector shapes so that the leading edge of one winding of the tubular helical form of the core strip can key with the trailing edge of an adjacent winding of the tubular helical form of the core strip in a leading to trailing edge abutting manner, the core strip carrying a row of protrusions extending orthogonally from both major faces of the core strip, an inner strip (preferably of width equal to the width to the core strip) able to be wound from a stored condition together with the core strip into (and back from) a helical tubular form inside of and against the core strip and comprising a row of holes for mating with the protrusions of the core strip, an outer strip (preferably of a width equal to the width of the core strip) able to be wound from a stored condition together with the core strip into (and back from) a helical tubular form outside of and against the core strip and comprising a row of holes for mating with the protrusions of the core strip, and wherein when assembled (a) the inner strip is presented at the trailing edge of the core strip in a manner to prevent the connector formations of the leading edge of an adjacent winding of the core strip that are engaged with the connector formations of the core strip at the trailing edge of the core strip from moving radially inwardly of the tubular helical form, and (b) the outer strip is presented at the leading edge of the core strip in a manner to prevent the connector formations of the trailing edge of an adjacent winding of the core strip that are engaged with the connector formations of the core strip at the leading edge of the core strip from moving radially outwardly of the tubular helical form.

Preferably the leading edge of the inner strip allows the connector formations of the core strip at the leading edge of the core strip to be exposed for engagement with the connector formations of the trailing edge of the core strip.

Preferably the trailing edge of the outer strip allows the connector formations of the core strip at the trailing edge of the core strip to be exposed for engagement with the connector formations of the leading edge of the core strip.

Preferably the core strip carries said protrusions extending orthogonally from the core strip a distance corresponding to at least the thickness of the inner and outer strip respectively and preferably located at the centerline of the core strip with regular intervals and preferably comprising a central ball extending outside the inner and outer strip when the tube is assembled.

Preferably the connector shapes key together in a manner to prevent edge to edge separation of the core strip in the tube axis direction by virtue of the connector shapes having an interference fit configuration.

In a further aspect the present invention may be said to be an extendable tube able to be assembled to a tubular form and disassembled to a non-tubular stored condition, the tube comprising of three flexible strips namely:

a core strip able to be wound from the stored condition into (and back from) a tubular helical form and having a leading and trailing edge at where complementary shaped connector sections of the core strip present a row of identical connector shapes so that the leading edge of one winding of the tubular helical form of the core strip can key with the trailing edge of an adjacent winding of the tubular helical form of the core strip in a leading to trailing edge abutting manner, the core strip carrying a row of protrusions extending orthogonally from both major faces of the core strip, preferably an inner strip (preferably of width equal to the width to the core strip) able to be wound from a stored condition together with the core strip into (and back from) a helical tubular form inside of and against the core strip and comprising a row of holes for mating with the protrusions of the core strip, an outer strip (preferably of a width equal to the width of the core strip) able to be wound from a stored condition together with the core strip into (and back from) a helical tubular form outside of and against the core strip and comprising a row of holes for mating with the protrusions of the core strip, and wherein when assembled (a) the inner strip is presented at the leading edge of the core strip in a manner to prevent the connector formations of the trailing edge of an adjacent winding of the core strip that are engaged with the connector formations of the core strip at the leading edge of the core strip from moving radially inwardly of the tubular helical form, and (b) the outer strip is presented at the trailing edge of the core strip in a manner to prevent the connector formations of the leading edge of an adjacent winding of the core strip that are engaged with the connector formations of the core strip at the trailing edge of the core strip from moving radially outwardly of the tubular helical form.

In still a further aspect the present invention may be said to be an assembler/disassembler for assembling and disassembling the extendable tube as herein described comprising:

an inner guide member with an outside guide surface of a radius slightly smaller than the inside diameter of the tube and having a helical guide (preferably a slot or groove) on its outside guide surface matching the helical angle of the strips once assembled, the projection of the core strip to engage at and be guided by the helical guide as the strips transition through the assembler/disassembler.

Preferably an outer drive assembly with an internal surface that is of radius slightly larger than the tube is provide having multiple grooves at an angle not parallel the groove of the inner guide member so as to create a plurality of nodes at where grooves cross over and at where projections of the core strip can register, the outer drive assembly able to be rotated relative to the inner guide member to cause the nodes to move in an axial direction and move the projections therewith.

Preferably relative rotation can be caused by a motor.

In another aspect the present invention may be said to be an assembler/disassembler for assembling and disassembling the extendable tube as herein described comprising:

an outer guide member with an inside guide surface of a radius slightly larger than the outside diameter of the tube and having a helical guide (preferably a slot or groove) on its inside guide surface matching the helical angle of the strips once assembled, the projections of the core strip to engage at and be guided by the helical guide as the strips transition through the assembler/disassembler.

In yet a further aspect the present invention may be said to be a linear actuator comprising the extendable tube as herein described and an assembler/disassembler via which the strips transition between their stored condition and deployed condition.

Preferably the tube able to be constructed from said strips comprises of said strips each of an elastically flexible material in bending, capable of plastic yielding in bending, the diameter of strips when constructed into said tube causing only elastic bending of the strips.

Preferably the strips are made from a metal.

Preferably the strips are of the same thickness as each other.

Preferably the strips are of the same yield strength (in bending) as each other.

Preferably the strips are of the same thickness as each other.

In a further aspect the present invention may be a method of deploying 3 spools of strips into a tube by consolidating the strips in an overlapping condition with each other each in a helical form of a constant diameter.

In a further aspect the present invention may a tube formed from 3 strips consolidated into a tube of a constant inside and outside diameter, the strips being in an overlapping condition with each other each in a helical form of a constant diameter.

Preferably the strips are formed into strips from a spool of said strips.

Preferably tube when formed, is of a total wall thickness comprising of the sum of the thickness of each strip, and the diameter of each of the strips when in the tube form, is smaller than the minimum diameter that a notional tube wall of said total wall thickness and of the same material as said strip, would plastically yield in bending.

Preferably the tube is engaged to the assembler/disassembler as herein described.

Preferably the tube is constructed by the assembler/disassembler as herein described.

BRIEF DESCRIPTION OF FIGURES

The figures below are meant to exemplify and clarify the invention. Like numerals in different figures represent the same feature.

FIG. 3a shows a side view of a tube.

FIG. 3b shows a view through section AA of FIG. 3a.

FIG. 3c shows a view of region B of FIG. 3b.

FIG. 3d shows a view of region C of FIG. 3b.

FIG. 3e shows a view of region D of FIG. 3b.

FIG. 5 is a side view of the assembler/disassembler of FIG. 4.

FIG. 6 is a sectional view through section AA of FIG. 5.

FIG. 6a is a sectional view of region B of FIG. 6.

FIG. 7 is a view of part of the assembler/disassembler with the lead-in/lead-our portion removed.

FIG. 8 is a view of the lead-in/lead-out portion and drive sleeve.

FIG. 9 is a view of assembly jacket and drive sleeve.

FIGS. 18A-D shows the inner guide sleeve and regions thereof.

FIG. 19B-G shows various views of the outer drive sleeve.

DETAILED DESCRIPTION

In the text below and for ease of explanation it is to be assumed that the tube 10 in use will stand up vertically. However it will be appreciated that it may extend horizontally or in any direction. Hence, for example, where reference is made to "upper" and "lower" and other such reference frame terms, it is to be taken in the contexts of the tube extending vertically.

Figure 2:
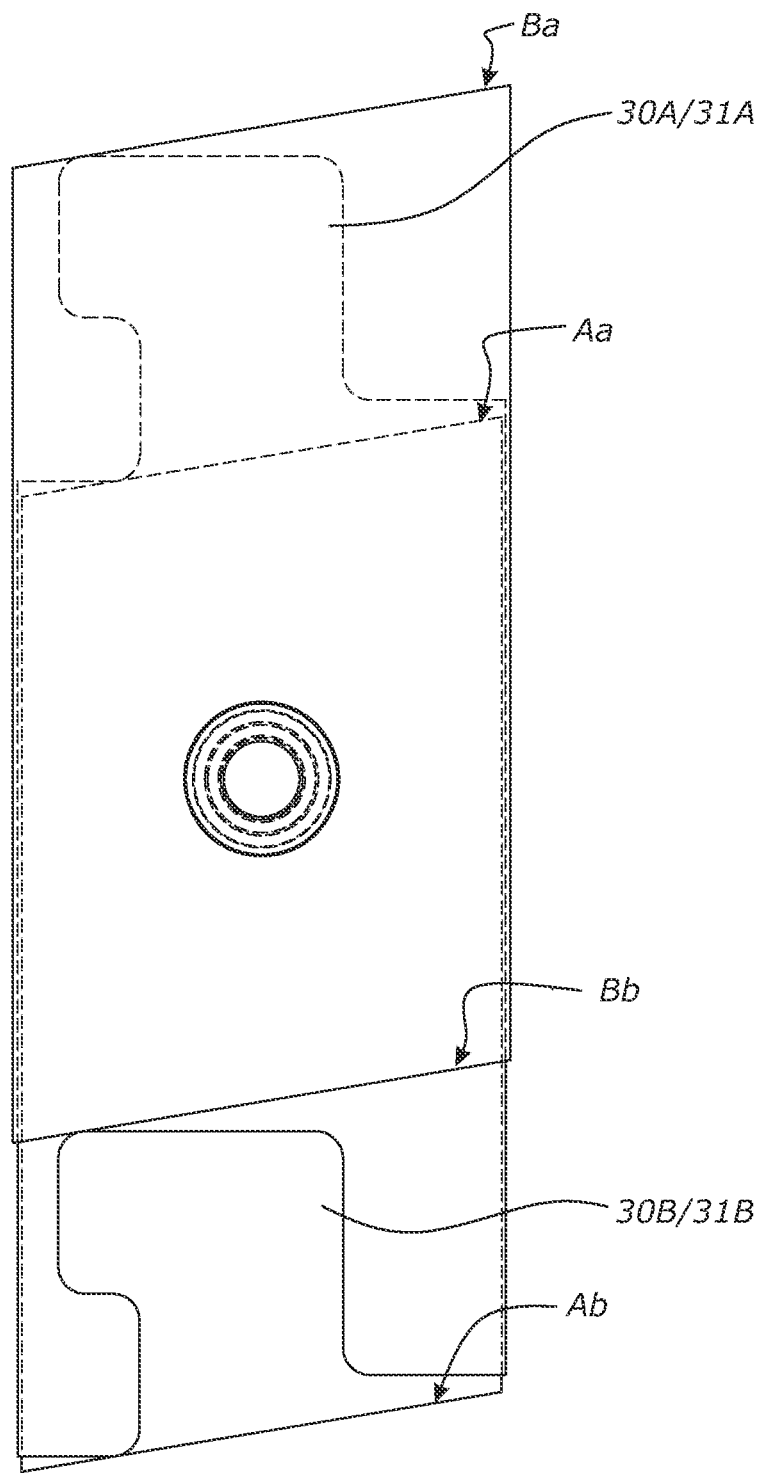
FIG. 2 illustrates the preferred relative position of a segment of the three strips in an overlapping condition.
Figure 2A:
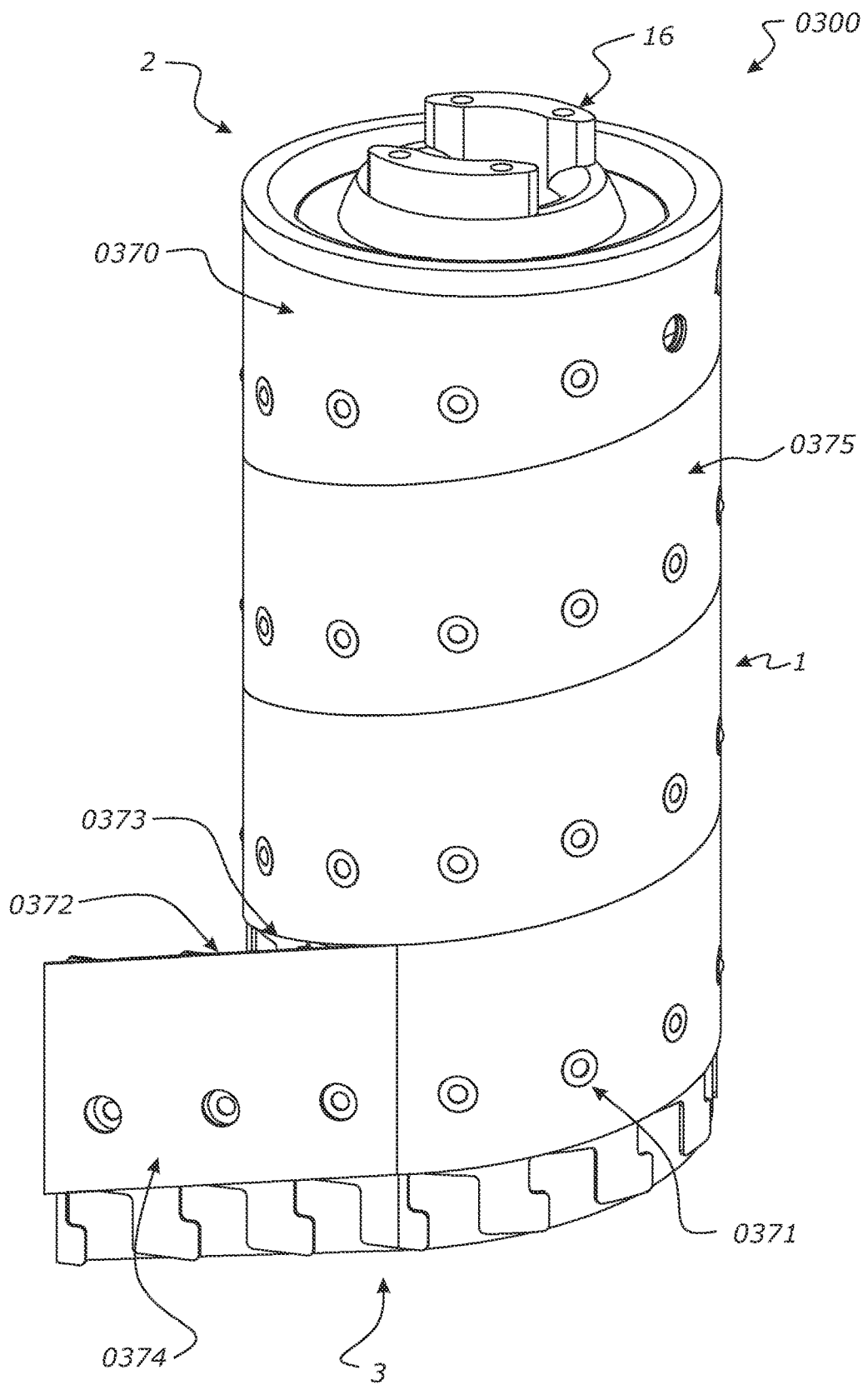
FIG. 2a shows a perspective view of a tube having been formed from the three strips and an cap at the distal end of the tube, provided for distal end termination purposes.

As seen in FIG. 2a, the assembled form of the tube 10 of the present invention has a wall 1 and a hollow core. The tube has a distal end 2 and a proximal end 3. At the proximal end 3 the tube is able to be assembled and disassembled in a number of ways that will herein after be described. In the preferred way the assembly and disassembly occurs by an assembler/disassembler 90 at where the proximal end of the tube is located. In a preferred form the distal end of the tube 10 may be terminated by a cap 16. The cap 16, as well as providing a terminal end to the tube, may offer other functionality as will herein after be described.

Figure 1A:
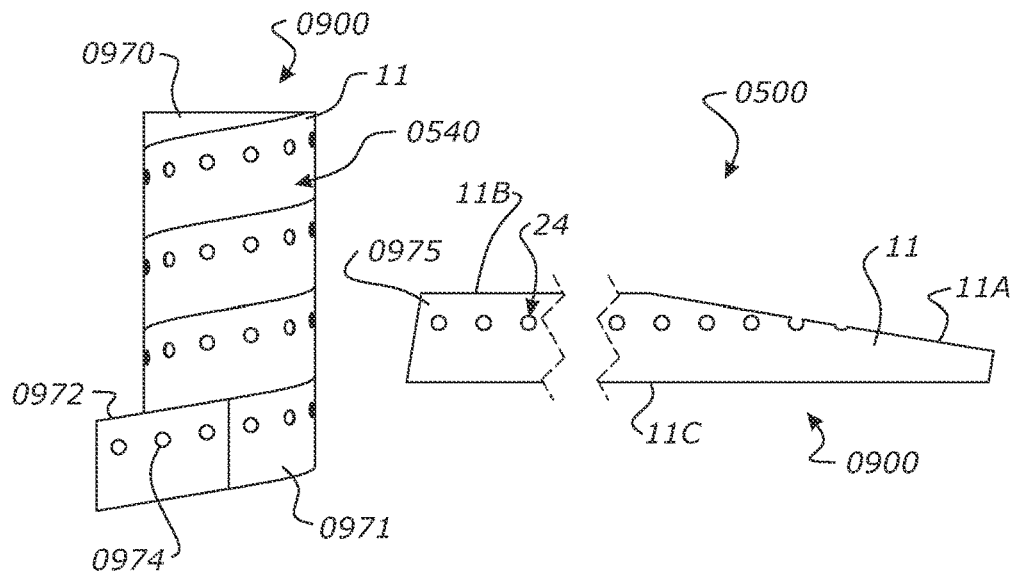
FIGS. 1a, b and c show the preferred forms of the inner strip, the core strip and the outer strip respectively.
Figure 1B:
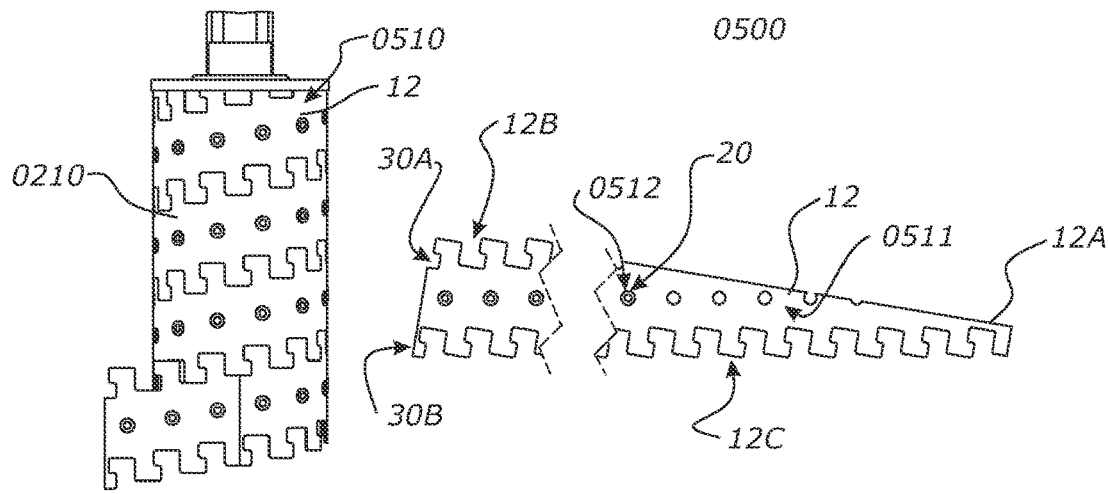
FIG. 1d shows a partially assembled form of a preferred form of the core strip.
FIG. 1e is external view of inner strip.
FIG. 1f is a sectional view of section AA of FIG. 1e.
FIG. 1g is a close up view of region B of figure if.
FIG. 1h is a close up view of region C of figure if.
FIG. 1i shows part of the inner strip.
FIG. 1j shows the outer strip.
FIG. 1k shows part of the outer strip.
FIG. 1l is an external view of the outer strip.
FIG. 1m is a sectional view of section AA of FIG. 1l.
FIG. 1n is a close up view of region B of FIG. 1m.
FIG. 1O is a close up view of region C of FIG. 1m.
Figure 1C:
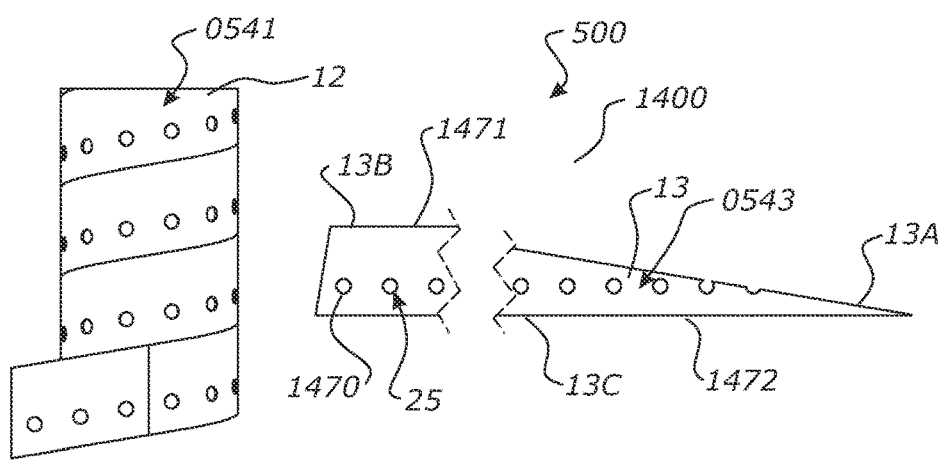
Figure 1D:
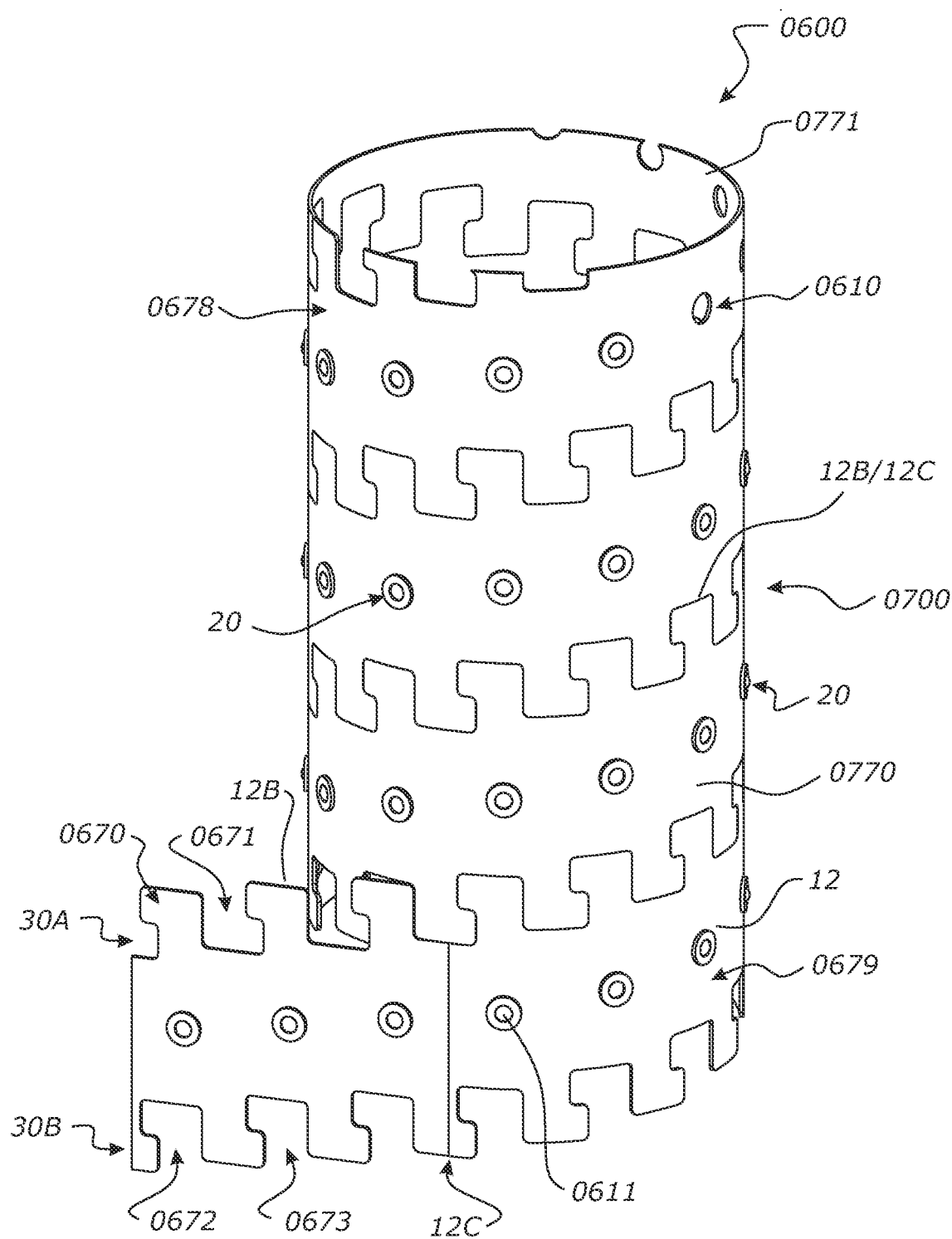

The wall 1 comprises preferably of three flexible strips 11,12,13. These are shown in FIGS. 1a, 1b, and 1c. The strips can be joined together and assembled in a helical fashion thus forming a tube 10. The wall 2 of the tube is preferably comprised of an inner strip 11, a core strip 12 and an outer strip 13. Each strip is preferably of constant width (preferably save for at its distal end 11a,11b,11c, where the strip may taper in order to define a square distal end of the tube). As seen in FIGS. 1b and 1d, the core strip is preferably edge profiled. Each strip is preferably generally of a constant thickness. Preferably each strip is generally of the same thickness as the other strips.

Each strip includes a leading edge 11b, 12b,13b and trailing edge 11c,12c,13c that run generally parallel to each other and parallel to the elongate direction of the strips. The leading edge of each strip is more advance the trailing edge in the tube axis when the tube is being assembled by and deployed from the assembler/disassembler.

When assembled the tube 10 presents the inner strip 11 inside of the core strip 12 and the core strip 12 is located inside of the outer strip 13.

When assembled the core strip is wound into a helical form of constant diameter and the pitch of the helix results in the trailing edge 12c of the core strip 12 being in abutting contact with the leading edge 12b. These edges do not overlap in a radial direction and hence the core strip, when deployed has its wall at a constant diameter. This edge to edge abutment of the leading and trailing edge helps transfer axial loads via the tube. The preferred keyed abutment that will herein after be described helps further enhance tube strength. The pitch of the helix if preferably the same or greater than the width of the strip so formed into a helical shape. Preferably the pitch of the helix of each strip is the same.

The core strip 12, at its leading and trailing edges, is preferably profiled to define leading and trailing connector section 30a, 30b at each edge of the strip with recurring identical connector shapes (31a, 31b). The connector shape 31a is complimentary of connector shape 31b to allow the shapes to key together, preferably in a tessellating manner. This can be clearly seen in FIG. 1d.

The configuration of the shapes is preferably such that the length of the helical circumference of the core strip 12 in the tube matches an integral number of shapes. The upper and lower connector shapes (31a, 31b) must be complementary. When assembled the keyed together lower and upper connector shapes help prevent shear displacement of the leading edge relative to the abutting trailing edge. This helps keep the tube in a tubular form of a constant diameter.

The inner and outer strips are provided primarily to ensure the leading to trailing edge abutment of the core strip remains in place. The outer strip is provided in a helical fashion about and directly onto the core strip such that it overlaps a leading to trailing edge interface of the core strip. This helps prevent a radial outward displacement of one of the leading edge relative the trailing edge so overlapped.

The inner strip is provided in a helical fashion inside of and preferably directly onto the core strip such that it overlaps the leading to trailing edge interface of the core strip on the other side of the core strip. This helps prevent a radial inward displacement of one of the leading edge relative the trailing edge so overlapped.

The inner strip leading edge when assembled as part of the tube is preferably in abutting edge contact with its trailing edge. This also helps transfer axial force along the tube. However, is some embodiments it's envisaged that the inner strip may not be in leading to trailing edge abutment but a space exists between such edges of the inner strip.

The outer strip leading edge when assembled as part of the tube is preferably in abutting edge contact with the trailing edge of the outer strip. This also helps transfer axial force along the tube. However, in some embodiments it's envisaged that the outer strip may not be in leading to trailing edge abutment with itself but a space exists between such edges of the inner strip.

The three strips are connected to each other when assembling the tube. This may be done manually or by way of the assembler/disassembler as herein described. The upper connector section 30a of the core strip 12 keys with the lower connector section 30b of a part of the core strip 12 located above. The trailing lower connector section 30a of the core strip 12 of the current winding keys with the leading upper connector section 30b of the core strip in the next winding. The inner and outer strips overlap the core strip edge to edge interface as the upper and lower connector sections key together. The upper connector shape 30a is preferably the mirror image of the lower connector shape 30b with some slight clearance. In a preferred embodiment the connector shapes 31b of the lower connector section 30b have a larger horizontal width at the lower end and the connector shapes 31a of the upper connector section have an identical larger width at the upper end. This is preferred because it can prevent vertical separation between the windings of the tube 10.

Figure 3F:
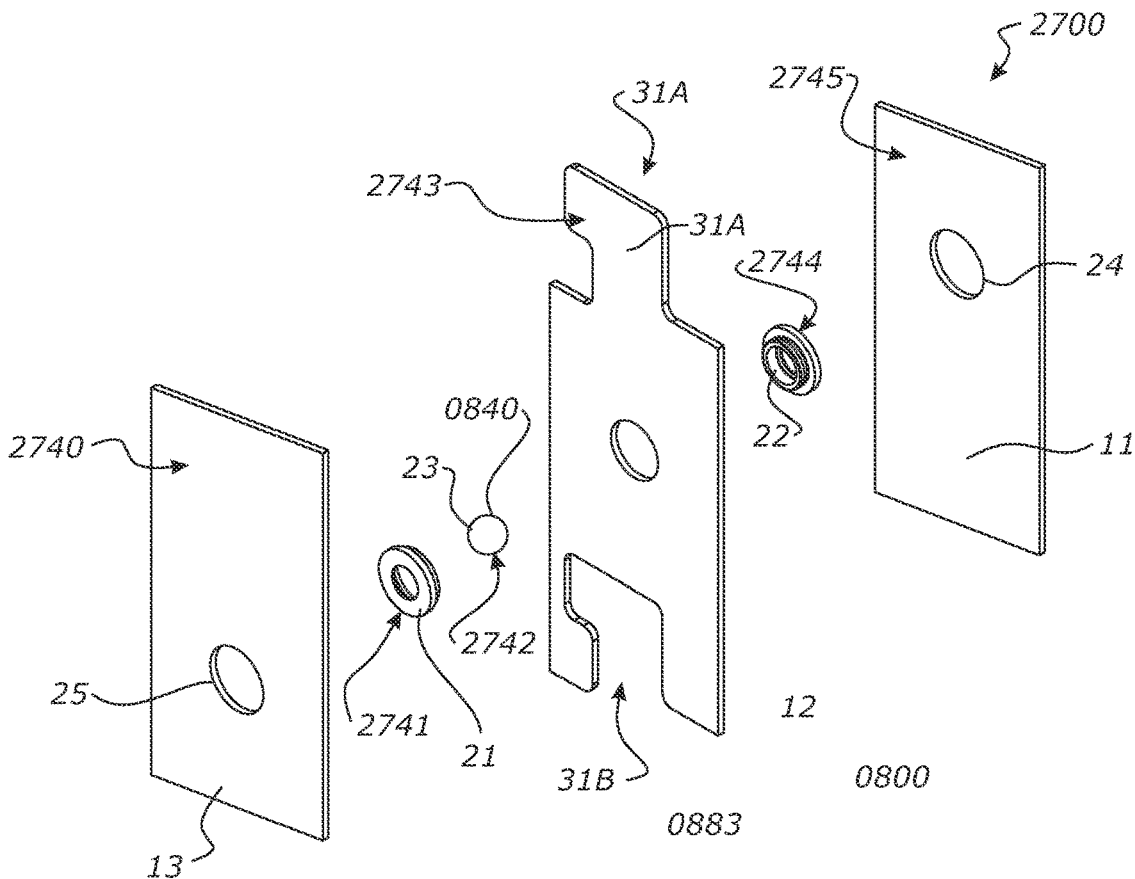
FIG. 3f shows an exploded view of region B of FIG. 3b.
Figure 3G:
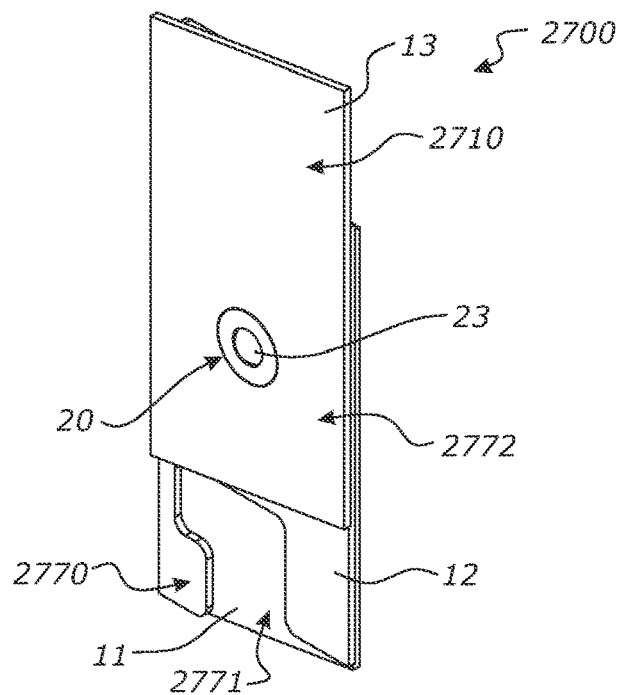
FIG. 3g shows an assembled perspective view of region B of FIG. 3b.

In a preferred embodiment shown in FIGS. 1-3 the connector shapes 31a, 31b are L-shaped with the vertical part of the L on the upper connector shape 31a connecting with the lower connector shape 31b of the core strip 12 of the previous winding first. This gives an advantageous hinging effect when assembling the strips. To avoid rotational forcing it is preferable with symmetrical and/or rectangular shapes standing vertically or horizontally when the tube is assembled. This causes the connector shapes 31a, 31b to be angled with respect to the center line of the core strip 12 with the same angle as the angle of the helix. The inner strip may also have connector shapes to interlock with itself in a similar fashion as the core strip does.

FIG. 2 illustrates the relative position of the three strips. The region Aa-Ab of the core strip 12 is covering the inner strip 11 and the region Ba-Bb of the core strip is covered by the outer strip. Or in other words the inner strip 11 is covered by the core strip 12 and the lower connector section 30b of the core strip 12 and the core strip 12 and the upper connector section 30 is covered by the outer strip 13 when the three strips are in the same winding.

The three strips have their distal ends preferably permanently fastened to an end cap 16. So whilst in the disassembled form the strips may be coiled in a spiral or spool or layflat or in another configuration, at least the distal ends of the three strips do not pass through the assembler/disassembler to the spool but are retained in a tubular form fastened to the end cap 16 and the regions of the strips near their distal ends are located in the assembler/disassembler, for repeated ease of and speed of deployment. The end cap 16 shown in FIG. 3b may not protrude much beyond the distal end of the tube before deployment to help keep height of the assembler/disassembler and end cap down. The diameter of the spool of each strip, when the tube is dis-assembled and the majority of the strip is part of the spool, is larger than the diameter of the tube when assembled.

The distal ends of the strips may be cut with a taper such as at an angle corresponding to the angle of the helix. The cap 16 may have an independently rotating head 16a for attaching different objects. In some assembly modes the tube may rotate as it is assembled and disassembled yet the object carried by the tube is not to be rotated. A free rotating head can allow this to happen.

The thickness of the material that may be used for the strips depends on the desired radius of the tube. It should be thick enough to withstand the axial and/or bending load intended for the tube 10 and thin enough to be able to be wound into a tubular form without folding or creasing or otherwise plastically yielding. Elastic yielding is hence desired. A benefit of using the preferred 3 strip configuration to define the wall of the tube is that the strips, individually, are thin yet together define a thicker effective wall thickness of an assembled form, thereby allowing a smaller diameter tube to be formed than if the tube were formed from one thicker strip.

The strip material should have spring-like properties (such as SS301-SRC550).

As an example of a tube formation can be made of a 34 mm diameter using 3×0.3 mm strips. As another example of a tube formation can be a 47 mm diameter using 3×0.4 mm strips.

In the preferred form, the core strip 12 carries or presents at least one row of bearing units 20. The bearing units are preferably evenly distributed along a row along the length of the core strip. Where only one row is provided, the row preferably extends along the centerline of the core strip. This can be seen in FIGS. 1b and 1d. The bearing unit provides two primary functions. First is to anchor the inner and outer strips to the core strip in the elongate directions of the strip and preferably also in the tube axial direction. This helps bind the strips of the tube in their tubular form tightly together which in turn helps keep the edge to edge interface of the leading and trailing edges of the core strip intact. It also helps prevent delamination of the strips. The second is to help guide the assembled strips through the assembler/disassembler. A third function, in some embodiments of the assembler/disassembler, the bearing units also facilitate the strips being driven by the assembler/disassembler for deployment and un-deployment therefrom.

In a preferred form, a bearing unit is comprised of an inner and outer cage 21, 22 with a free rolling ball 23 inside. The ball is provided to help reduce resistance to movement of the strips as they transition through the assembler/disassembler and to guide the strips through this transition. The cage 21, 22 protrudes from each major face side of the core strip 12, preferably with a distance corresponding to the thickness of the inner and outer strips 11, 13 respectively. In one embodiment the two parts of the cage may be clicked and/or bonded together in a preformed hole in the core strip, wherein the two parts constitute a cage that holds the ball 23. The ball protrudes slightly outside the inner surface of the inner strip 11 and outside the outer surface of the outer strips 13 when the strips are assembled together. Such protrusion is provided to allow the assembly of strips to be driven and/or be guided through the guide sleeve. The ball acts as a bearing. The ball may be a roller bearing instead.

The inner and outer strips 11, 13 have corresponding holes 24, 25 mating with the bearing units on the core strip 12 when the strips are assembled together. In the preferred form the holes 24, 25 are through holes. However, it is envisaged that the holes may be blind holes deep enough to receive the thickness of the cage protruding from the core strip yet allowing the outer face of the inner strip to rest on the inner face of the core strip and the allowing the inner face of the outer strip to rest on the outer face of the core strip when the strips are assembled in their tubular form. Where the holes on the inner and outer strips are through holes, the thickness of the cage protruding from the core strip on each side of the core strip is preferably equal to the thickness of the inner and outer strips respectively. In the preferred form the inner and outer strips are the same thickness and the same thickness as the core strip. In the preferred form the strips are all made of the same material. This may be, but is not limited to, a metal such 301 stainless steel, plastic, or flexible circuit board material.

The distance between subsequent holes on the inner and outer strip 11, 13 correspond to their slightly different radiuses when joined together in the tube 10. Where the core strip has the row of bearing units located along its centerline, the row of holes 24 on the inner strip 11 should also be offset a distance (preferably up) from the center line of the strip and the row of holes 25 on the outer strip 13 should be offset the same distance (preferably down) from the center line of the strip. This helps establish the overlap between the edge to edge interfaces of the leading and trailing edges of the core strip. It will be appreciated that where the inner strip and/or outer strip are not of a shape and configuration to have their abutting interface of their leading and trailing edge, then this centerline offset aspect may not apply.

It is envisaged that in a less preferred form, the anchoring of the core strip to the inner strip (as provided for in the preferred form by the bearing cage 21) may occur at different locations to where the core strip is fastened to the outer strip (as provided for in the preferred form by the bearing case 22). The bearing cage may not provide the function of retaining a ball 23 (eg where no ball is provided) and instead may merely be a first protrusion from one side (inside) of the core strip and another protrusion from the other side (outside) of the core strip to anchor with the inner and outer strips respectively. The inside protrusion and outside protrusion may be radially aligned with each other or may be offset from each other so long as the holes in the inner and outer strips are presented to be anchored by the inside and outside protrusions respectively. The inner and outer protrusions may protrude beyond the thickness of the inner and outer strips to present themselves also for being guided through the assembler/disassembler. In other words to serve the same function as the ball of the bearing units previously described, just not as well because frictional resistance will be greater. The protrusions may be cylindrical shaped to locate in round holes of the inner and outer strips or may be of another shape to locate into matching holes of the inner and outer strips. The protrusions may also assist in axial load transfer between windings along the tube.

In a less preferred form the tube may be comprised of only two of the strips. For example the tube may be formed from the strips herein referred to as the outer strip and core strip. No inner strip may be provided. In this case the core strip may present only outside protrusions to locate at receptacles of the outer strip. Or the outer strip may carry inwardly presented protrusions to locate at receptacles of the core strip.

The tube 10 may be assembled manually by hand by simultaneously binding the strips together as they are wound into a helix. Alternatively an assembler/disassembler 90 may be used via which the strips transition, between their tubular form and stored form. The assembler/disassembler may include a strip storage region or the strips may be stored externally of the assembler/disassembler.

Figure 4:
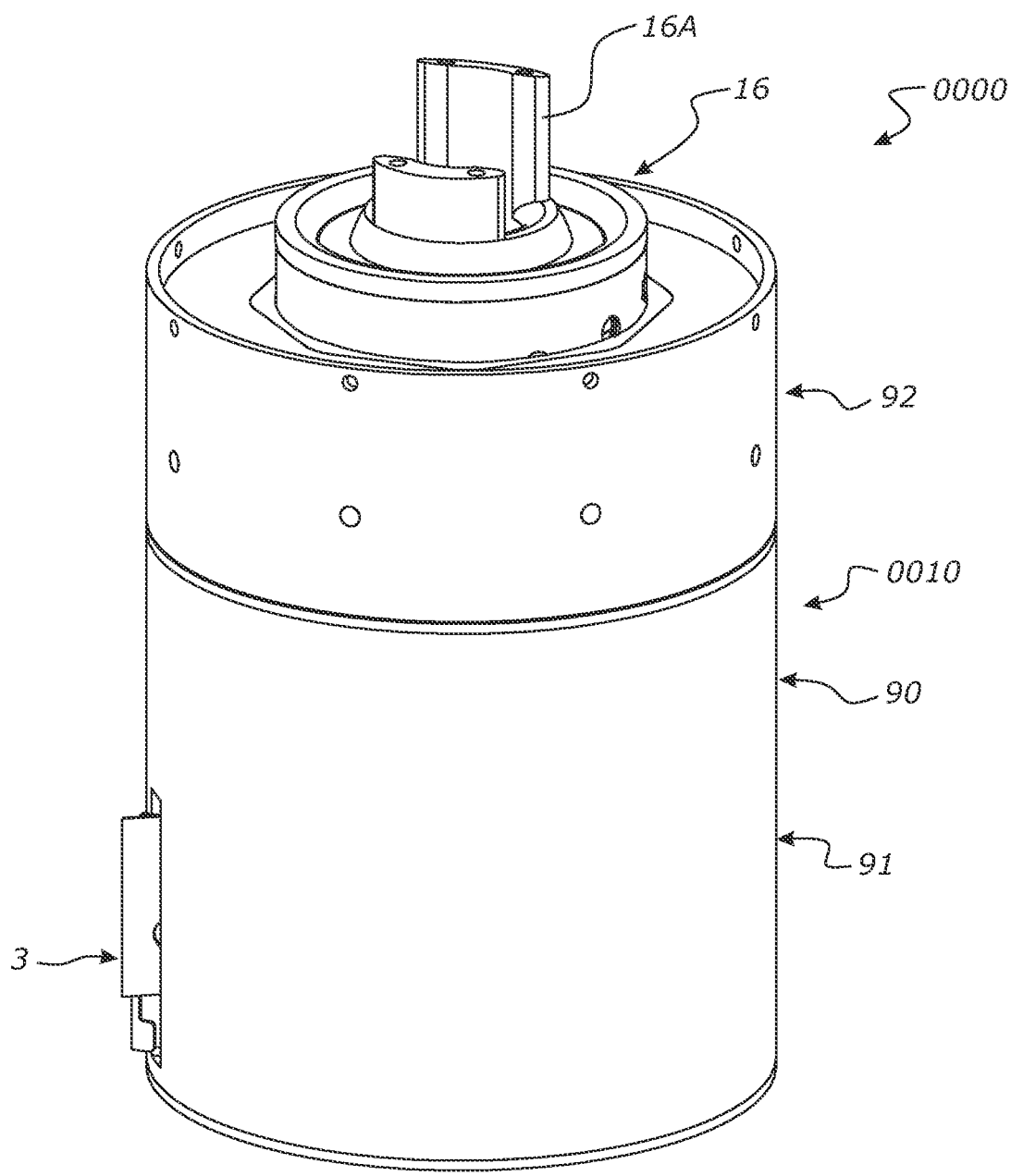
FIG. 4 shows a preferred form of an assembler/disassembler that may be used for assembling and disassembling the strips to and from the tubular form.
Figure 10:
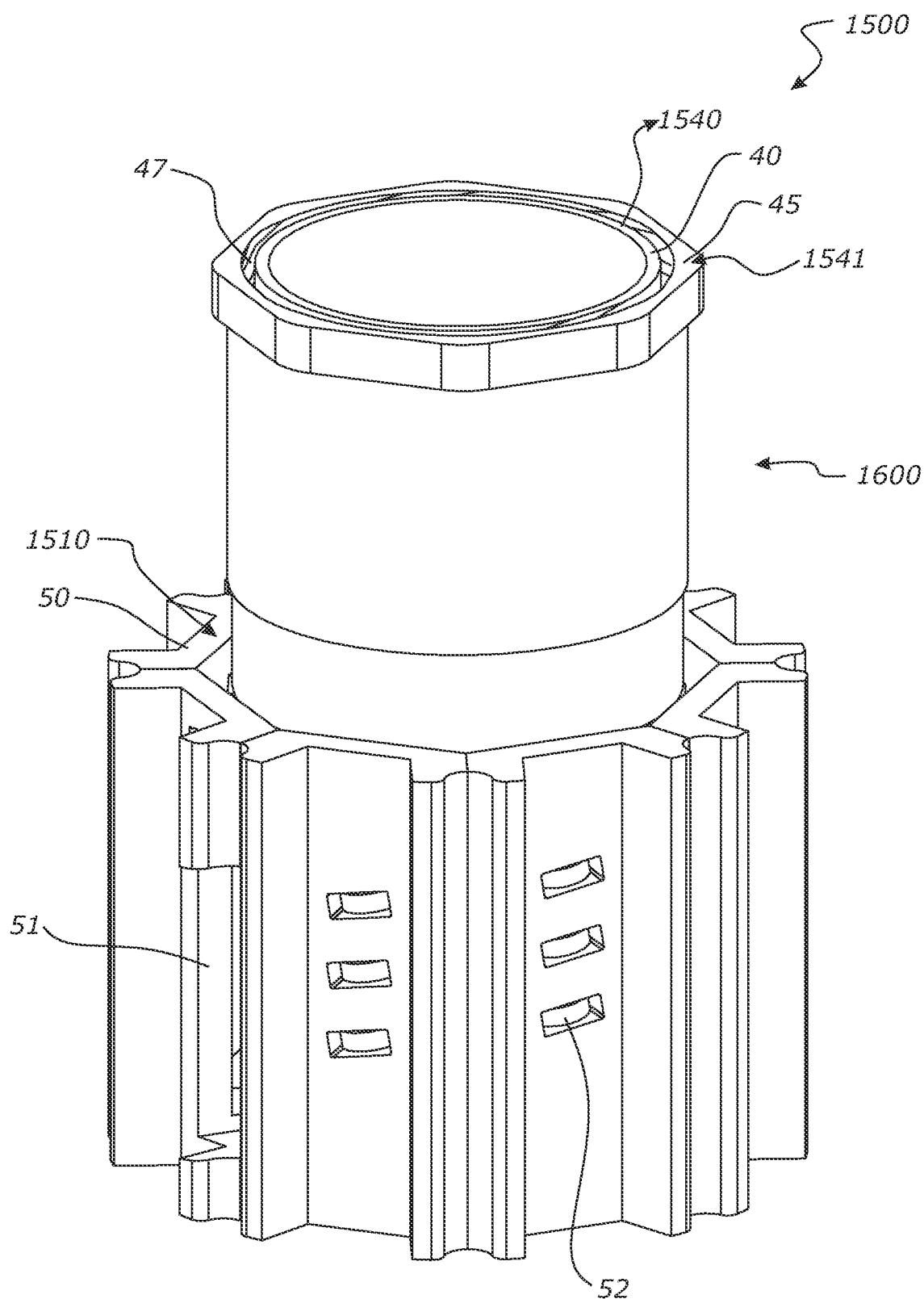
FIG. 10 is a perspective view of FIG. 9 also showing the guide sleeve.
Figure 11:
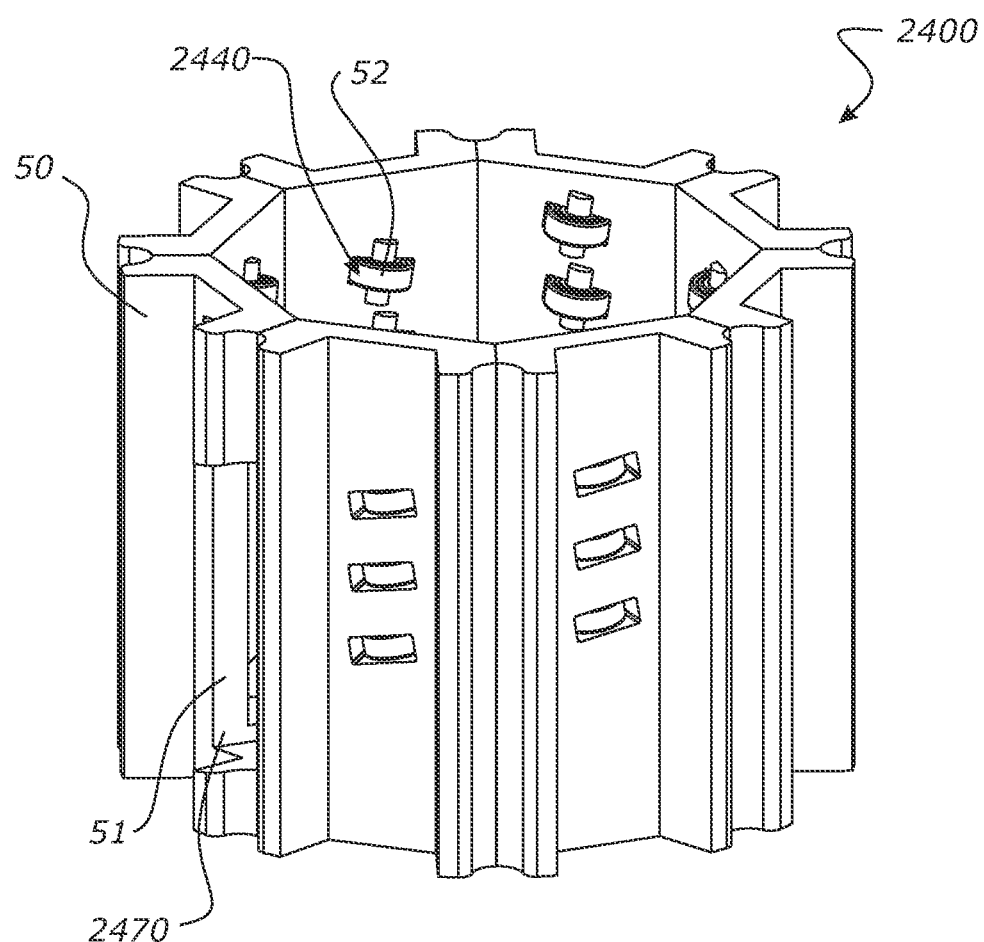
FIG. 11 is a view of part of the assembler jacket.
Figure 12A:
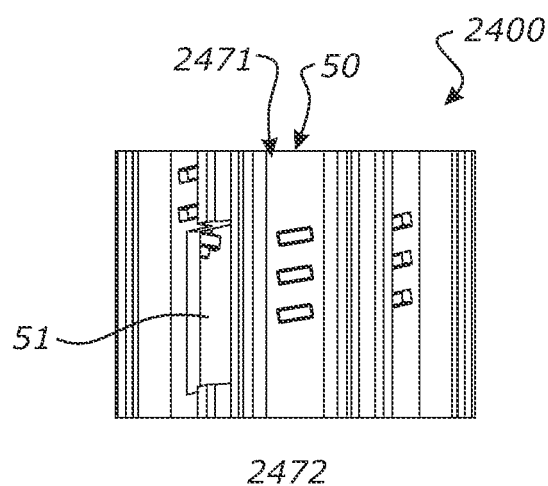
FIG. 12A is a side view of FIG. 11.
Figure 12B:
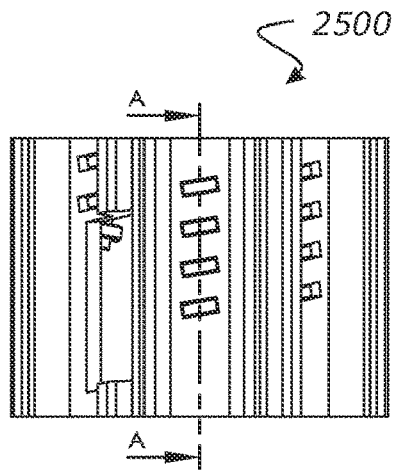
FIG. 12B-12F show components of the jacket/guide.
Figure 12C:
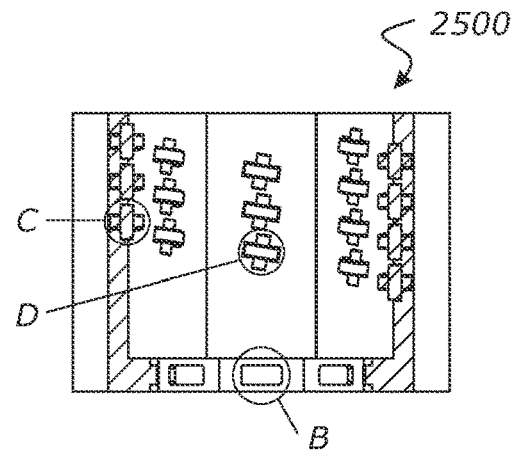
Figure 12D:
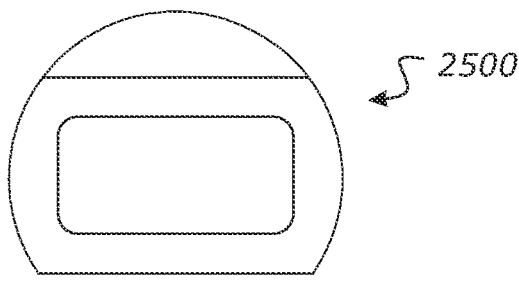
Figure 12E:
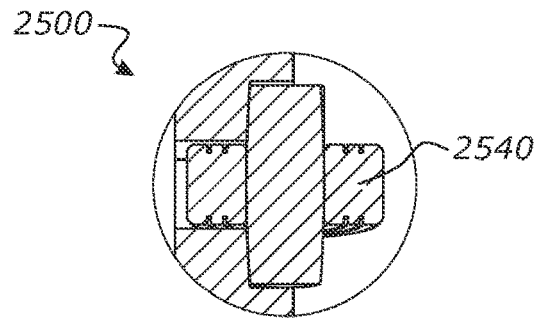
Figure 12F:
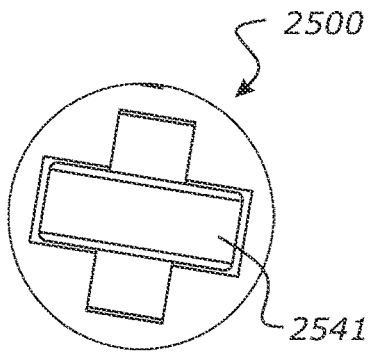
Figure 13:
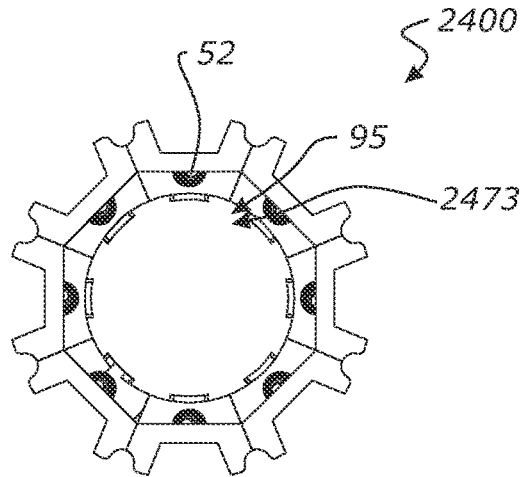
FIG. 13 is a top view of FIG. 13.
Figure 13A:
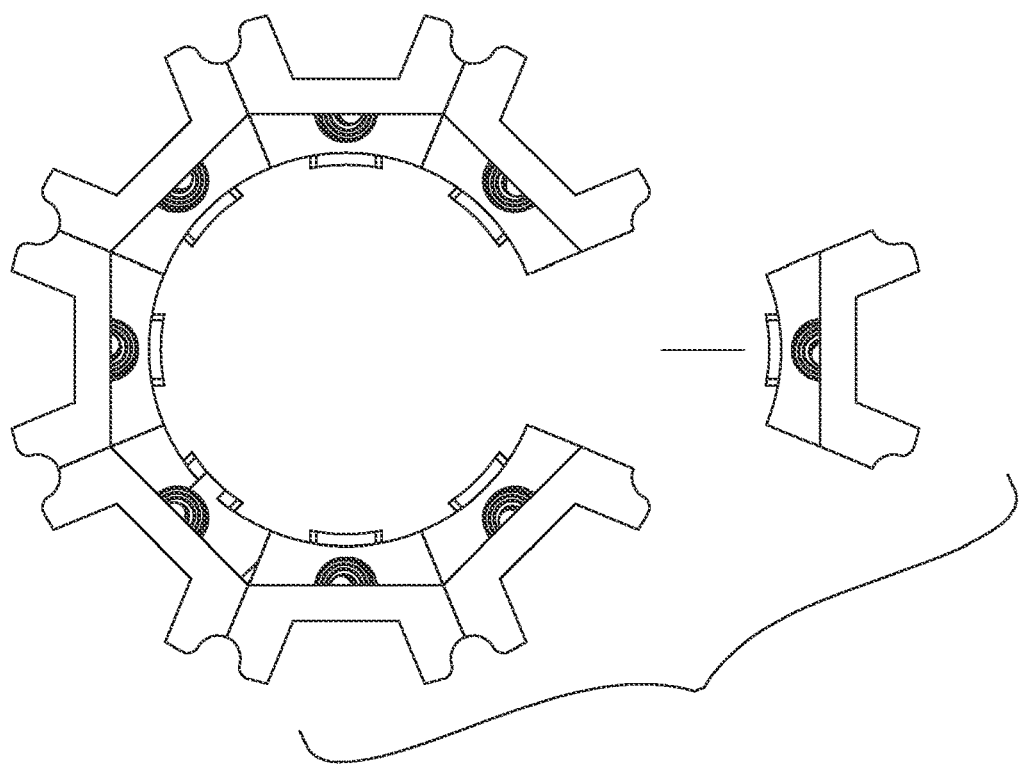
FIG. 13A-13B show components of the jacket/guide.
Figure 13B:
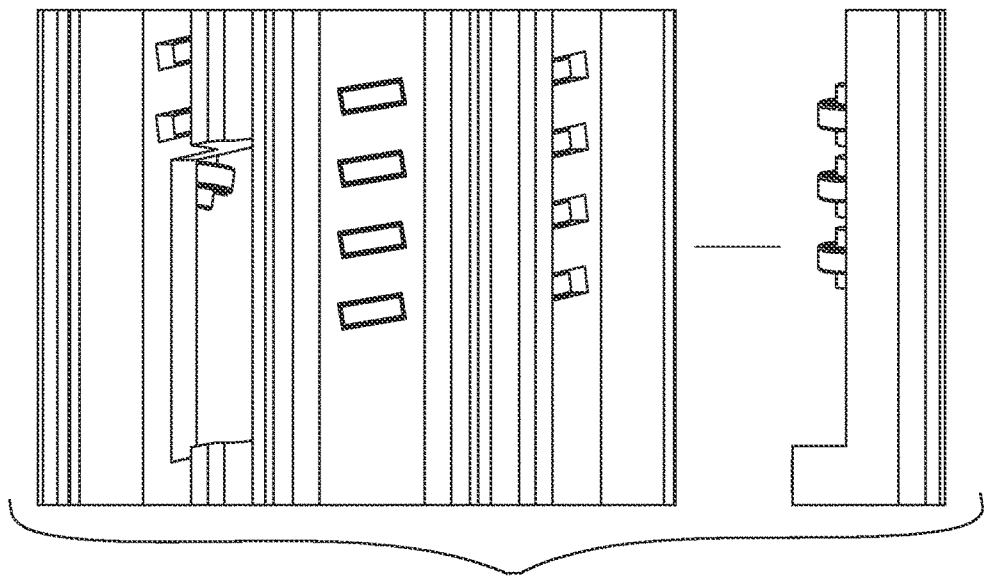
Figure 14:
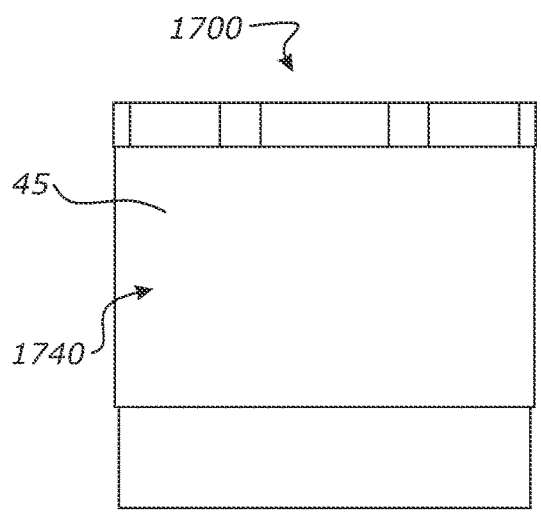
FIG. 14 is a side view of the drive sleeve.
Figure 15:
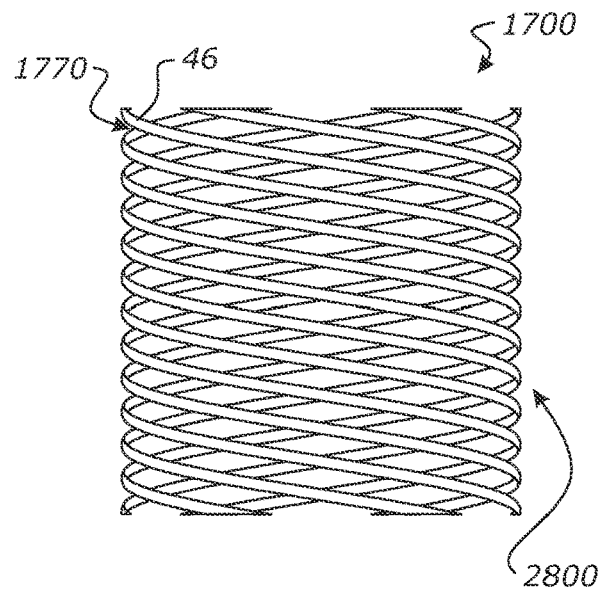
FIG. 15 is a view of the slots on the drive sleeve.
Figure 16:
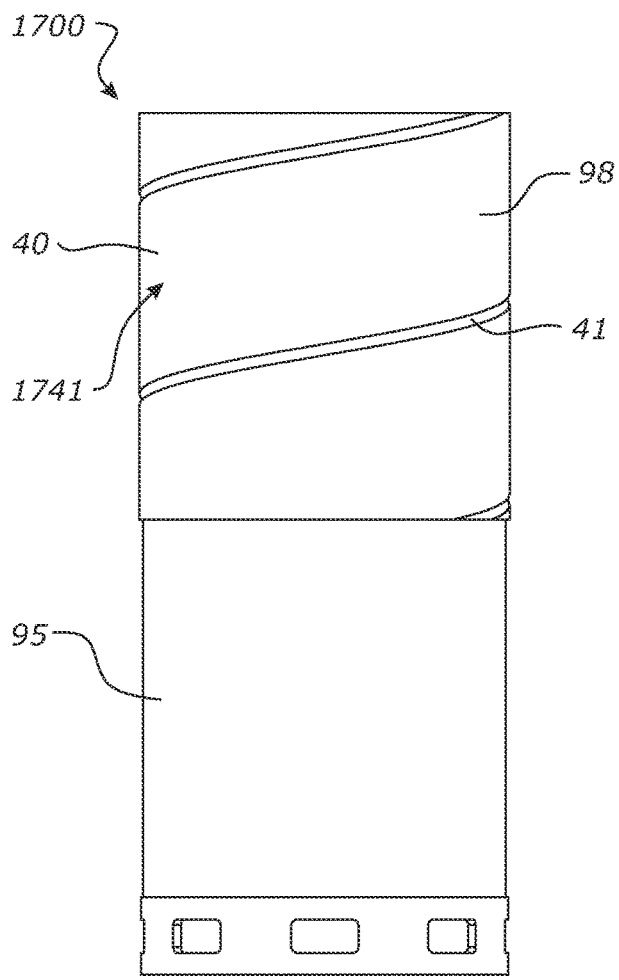
FIG. 16 is a side view of the inner guide sleeve.
Figure 17:
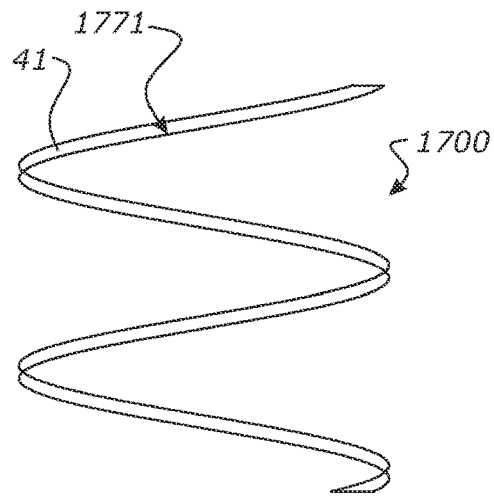
FIG. 17 is a view of the slot of the guide sleeve.
Figure 18:
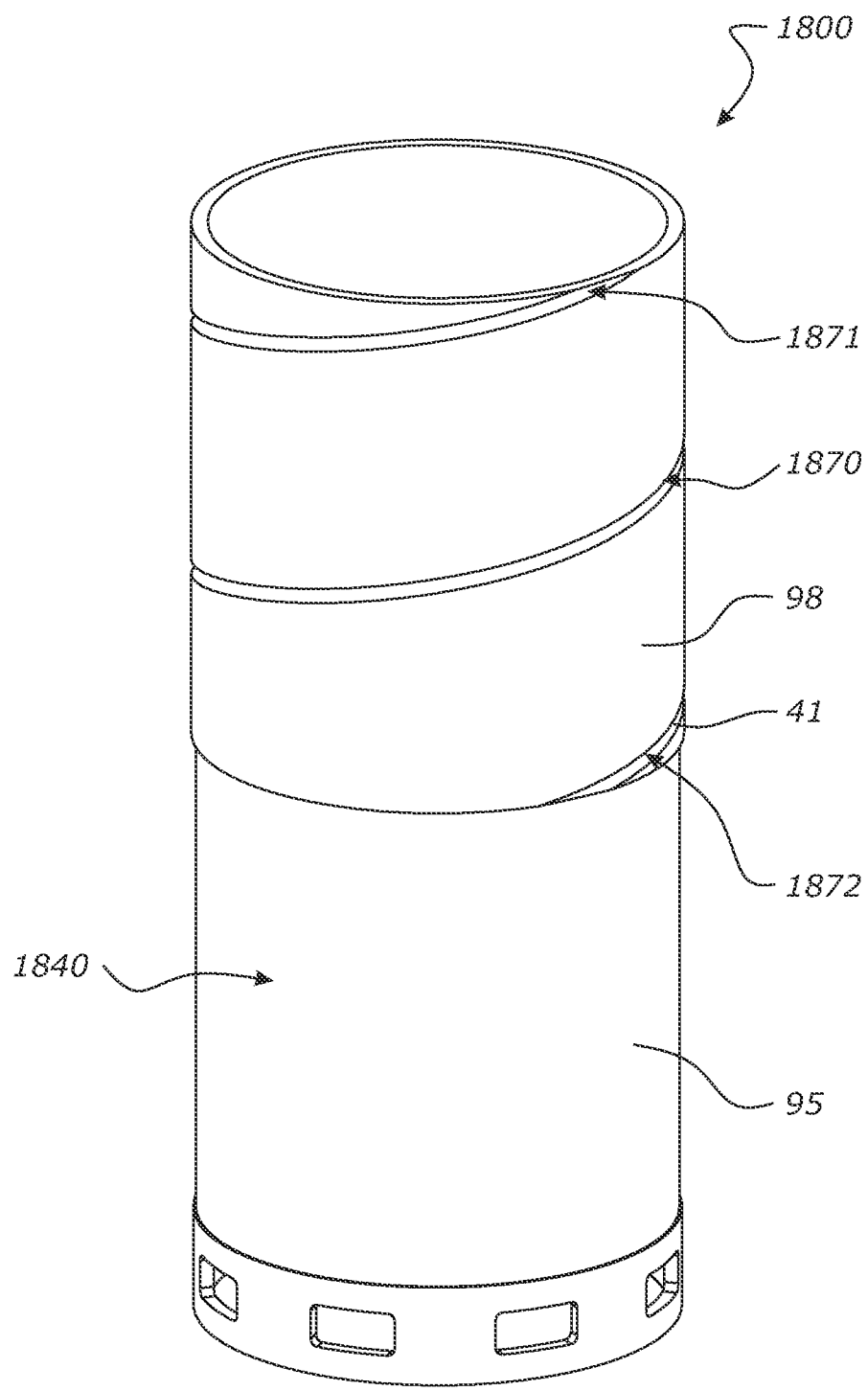
FIG. 18 is a perspective view of the inner guide sleeve.

In one form, the assembler/disassembler 90 as seen in FIG. 4 may have a lead-in/lead out portion 91 and a guide portion 92.

In its basic form, at the lead-in/lead-out portion 91 of the assembler/disassembler 90 the strips, for assembly into their tubular form, are simultaneously bent into a tubular form of diameter proximate the final tube diameter and are brought together in a radial direction to consolidate them for forming the wall of the tube. If not already, the protrusions/bearing units of the core strip become anchored with the inner and outer strips at the lead-in/lead-out portion 91 as the strips advance to the guide portion 92 of the assembler/disassembler 90. The lead-in/lead-out portion 91 may have a housing 93 with an opening 94 for the strips to be fed into for subsequent assembly into the tubular form. When disassembling the strips, the strips pass in the opposite direction through the lead-in/lead-out portion 91 and the strips are moved from their tubular form to exit via the opening 94. The construction of the strips preferably occurs from a spool of each of the strips that is preferably of a size larger than the diameter of the tube. The strips are fed through the assembler/disassembler for construction in a manner to progressively decrease in diameter until the tube diameter is reached. It the construction occurs outside to in. It will be appreciated that the construction could occur from the inside to out where the strips merge for construction in the assembler/disassembler from a diameter smaller than the tube diameter.

Inside of the housing 93 (if provided) of the lead-in/lead-out portion 91 may be an assembly jacket 50. Together with an internal lining 95 that may be a lower extension of the inner sleeve member (herein after described) the assembly jacket defines a substantially cylindrical passage 96 for the strips to helically move through. The jacket constrains the strips in a radially outward direction and the internal lining constrains the strips in a radially inwardly direction during the transition through the assembler/disassembler. The assembly jacket and internal lining are preferably concentric and define a passage that is sufficiently narrow so as to ensure the strips are consolidated with each other therein. The jacket 50 has an opening 51 via which the strips pass. The opening is aligned with the opening 94 of the housing 93 (if provided).

In a preferred form the assembly jacket includes a plurality of bearings 52. These help reduce frictional resistance to the passage of the strips through the assembler/disassembler. In some embodiments there may be no bearings of the jacket 50. Frictional resistance may be higher in such designs. Where provided, the bearings are preferably positioned in a cylindrical configuration to one another and can roll parallel with the helical direction of motion of the strips, for directing the three strips through the lead-in/lead-out portion. The bearings are preferably set so as to force the strips into a slightly smaller diameter than the tube as the strips enter the passage 96 during assembly, in at least the lower parts of the lead-in/lead-out portion 91. The strips are anchored together by the bearing units but the connector shapes are not keyed together due to this narrower diameter format of the strips. The connector shapes to be keyed together are in slight overlap with each other as a result. As the strips advance towards the guide sleeve, the strips are allowed to relax slightly by not being so forced, thereby increasing the diameter of the strips and allowing the connector shapes to slip from their slight overlapped condition into their keyed relationship. FIG. 6*a* shows the lower bearings set to define a slightly narrower diameter of the strips and the connectors 31*a* and 31*b* not keyed together. The top bearings may be set to allow the strips to assume the diameter of the tube as the strips progress through the assembler/disassembler for assembly.

Alternatively strips may transition from the forced narrower diameter to the diameter of the tube between the bearings and the guide sleeve. The reverse applies as the strips move from their assembled condition through the lead-in/lead-out portion towards the opening 51. Causing relative sliding of the connectors that are to key together facilitates a snap-lock like action of such connectors when they become aligned. This helps ensure keying occurs as the strips are moved to their assembled condition.

At the guide region 92 the strips are preferably maintained in their consolidated and keyed form and retained in a helical configuration to allow their extension and retraction in the tube axis direction relative to the assembler/disassembler.

In the basic form the guide region 92 acts in a manner analogous to a nut and the tube as the bolt. The helical thread of the nut is able to receive the helical thread of the bolt and as one is caused to rotate relative the other, axial displacement of the bolt relative the nut occurs. In a similar way the guide region of the present invention may have an outer guide member that has an internal helical groove that can receive the row of bearing units presented outwardly of the outer strip.

In a more preferred form and as will now be described, the guide region preferably has an inner guide member 40 that presents on its outer cylindrical surface 98 a helical groove 41 to receive the row of bearing units presented inwardly of the inner strip. In a similar manner to an outer guide member version with an inwardly presented helical groove, the helical groove of the inner guide member allows the tube to be wound relative to the inner guide member and be caused to move in a tube axis direction relative the inner guide sleeve. This can happen in both directions to deploy the tube and un-deploy the tube from the assembler/disassembler.

Should there be two or more rows of bearing units the inner guide sleeve will feature a helical groove for each row. The geometry of the groove(s) is such as to be able to receive the ball of the bearing unit. Where the bearing unit is merely in the form of a protrusion then the protrusion is received in the groove. The helical angle of the slot matches the helical angle of the strips of the tube. In this basic form of assembler/disassembler, the tube is required to be rotated relative the assembler/disassembler in order to transition the strips there through for assembly to and disassembly from their tubular form. This rotation can be caused by hand or by rotating the tube and ensuring the assembler/disassembler is held fixed.

Figure 19:
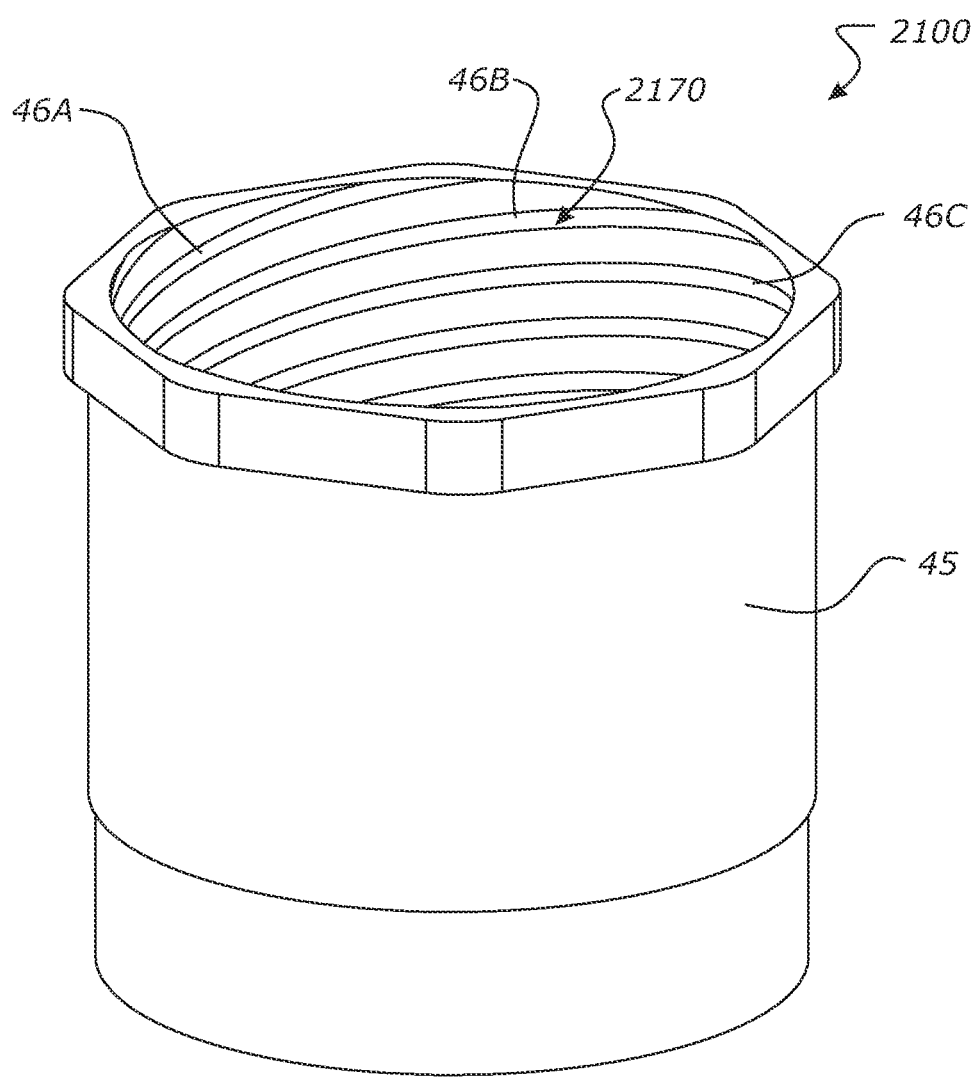
FIG. 19 is a perspective view of the outer drive sleeve.
Figure 19A:
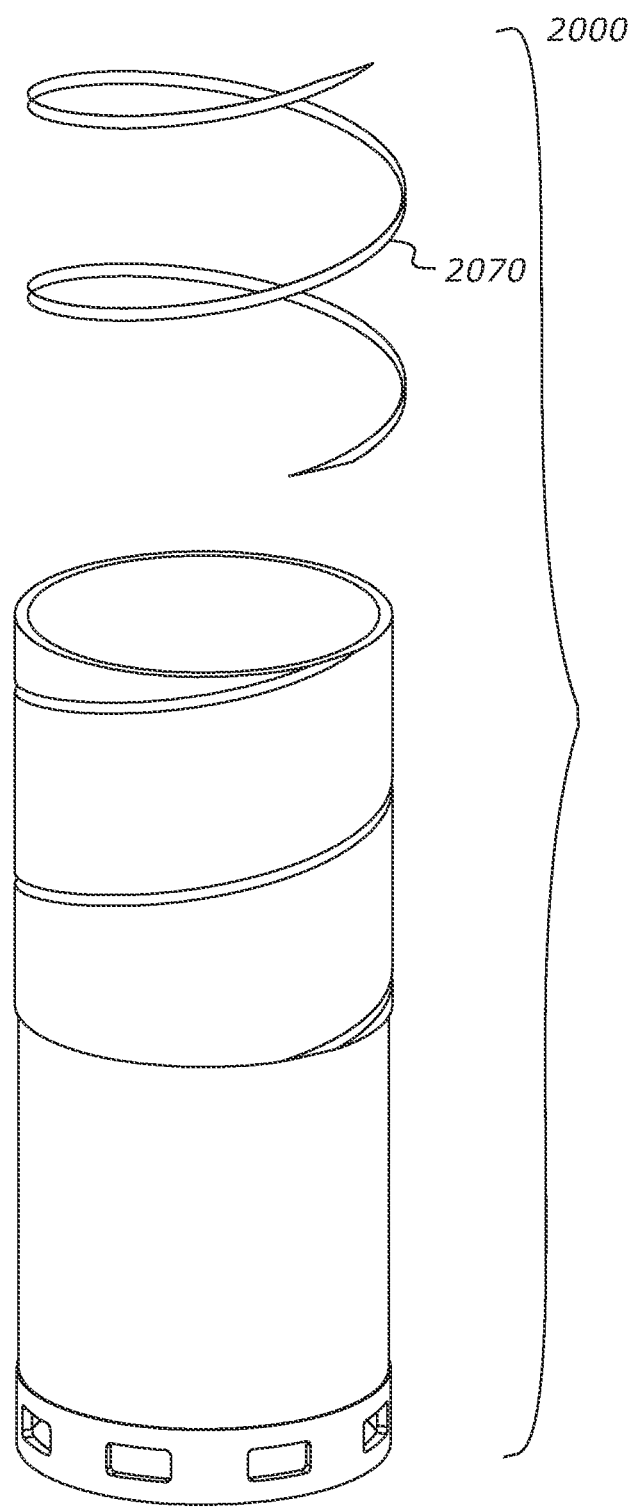
FIG. 19A shows the inner guide sleeve.

In another form the assembler/disassembler may further include a drive member 45 to cause this relative rotation. In this manner the assembler/disassembler and strips can offer the functionality of a self-contained linear actuator.

Where the guide member 40 is provided internal of the tube at the assembler/disassembler, the drive member 45 is provided at the outside of the tube preferably as a sleeve. The drive member 45 has a radius slightly larger than the tube and has multiple grooves 46*a, b, c*, etc as seen in FIG. 19. Grooves preferably follow a helical shape at a helical angle of *a* and are wound in opposite direction as the groove 41 in the inner guide member 40. The part or parts of the bearing units extending outwardly of the outer strip engage in the grooves of the drive member. It is preferably only the ball bearings of the bearing units that engage in the grooves.

The difference in radius of the inner guide member 40 and outer drive member 45 may leave a gap 47 such that the three strips fits there between with only a small clearance. Ideally the grooved surfaces of the two sleeves should only touch the balls 23 in the bearing units and not the strips. The clearance between the strips and the guide member and drive member should be small enough relative to the depth of the grooves (41, 46*a, b, c*, etc.) for the bearings to be able to hold the tube without slipping at a predetermined load on the tube 10, and wide enough to avoid friction.

Figure 20:
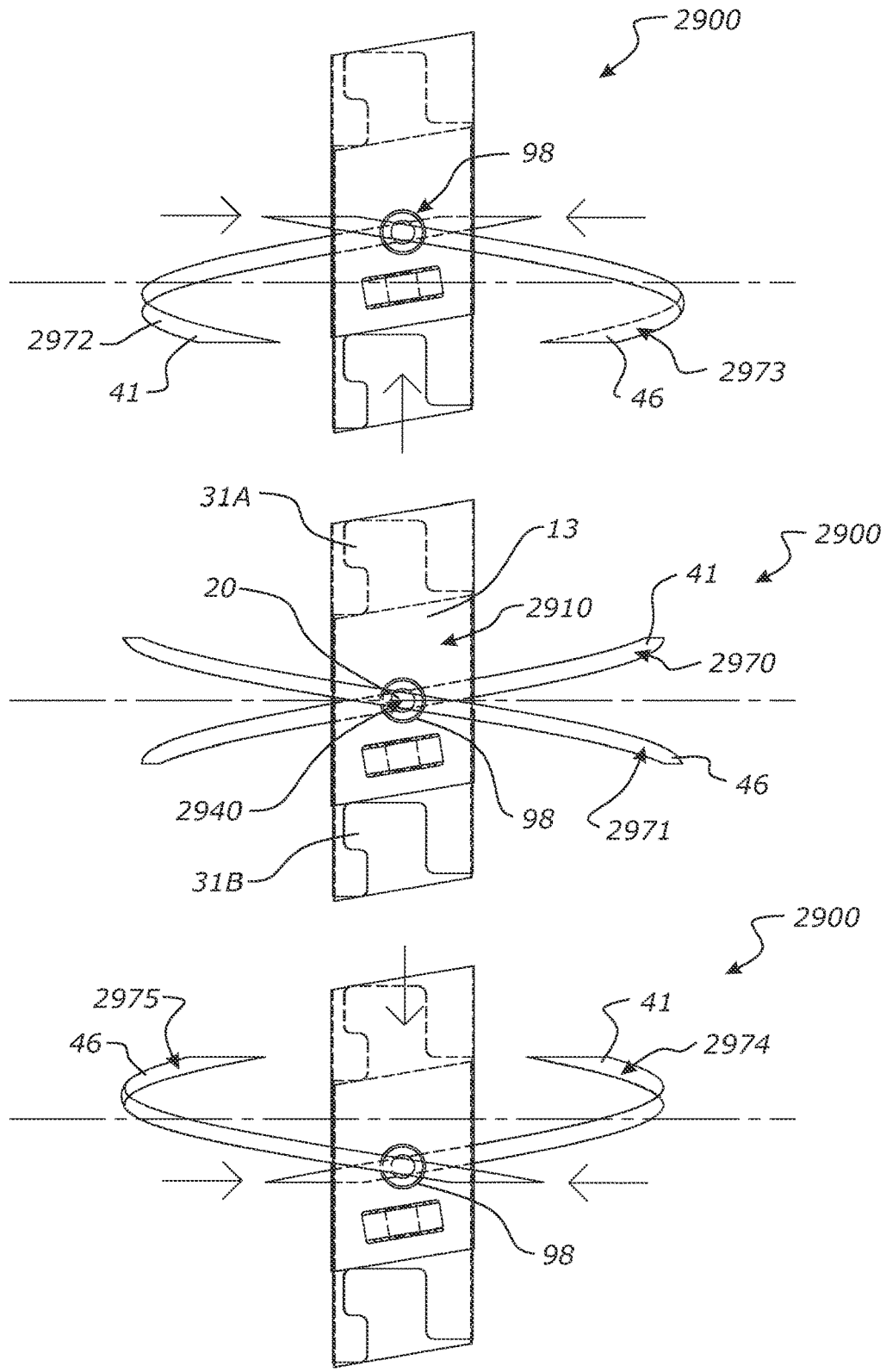
FIG. 20 illustrates the movement of a bearing in the two helical tracks.

Bearings in the guide zone 92 are located at a cross over zone 98 of the inner and outer grooves 41, 46 as seen in FIG. 20. When the guide member and drive member rotate relative to each other the cross over zone 98 moves in a tube axis direction. Thereby the tube 10 can be deployed or un-deployed from the assembler/disassembler. The drive member preferably has a helical track. But in some forms the tracks may extend purely parallel to the tube axis. A cross over point for bearings transitioning through the assembler/disassembler would still be provided.

A drive train 80 may be connected to a power source 100 to cause the inner guide member and the drive member 40, 45 to rotate in relation to each other. In its simplest form the train is a cogwheel drive fastened to the outer circumference of the outer drive member 45 and change of direction can be achieved by changing polarity on an electrical motor.

Figure 21:
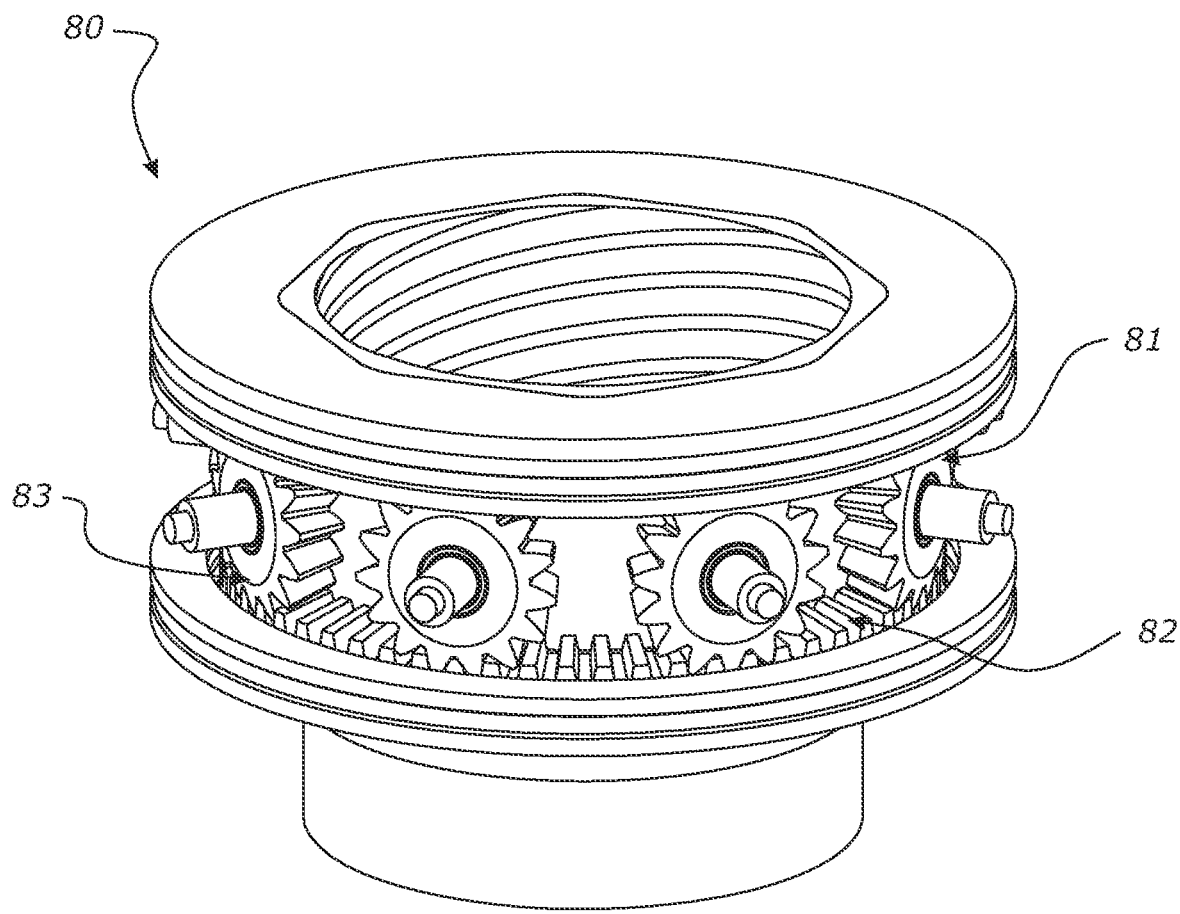
FIG. 21 shows a variation of a drivetrain.
Figure 22:
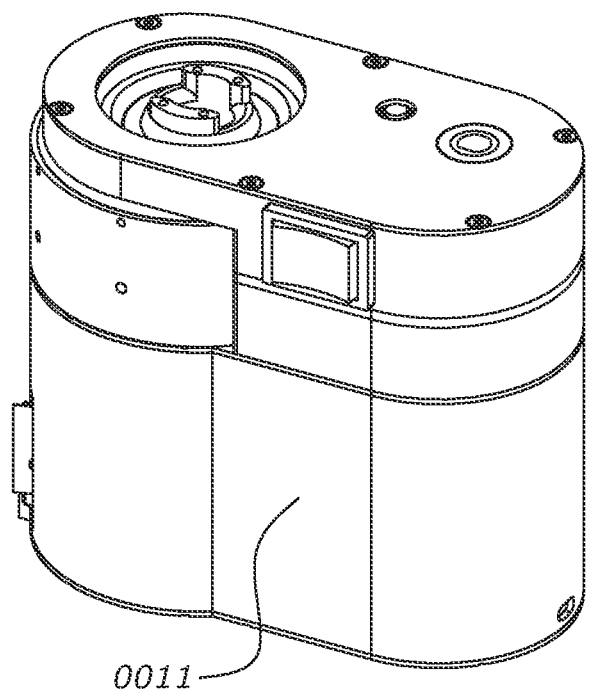
FIG. 22 is a view of a linear actuator that uses the assembler/disassembler and strips as herein described, also including a motor.

A more advanced train can be seen in FIG. 21. In this embodiment the drivetrain comprises a gear head comprising an upper 81 and lower 82 bevel gear ring with toothed surfaces facing each other and having cogwheels 83 between them causing the two bevel gear rings 81, 82 to rotate in opposite directions. The upper bevel gear ring is attached to the drive member and the lower bevel gear ring is attached, directly or indirectly, to the inner guide member. Thus the outer drive member is held firmly in position. The power source or motor 100 is connected directly or indirectly to one or several of the cogwheels or to the upper bevel gear.

A power source to drive the assembler/disassemble is desirable. It could be hand cranked or driven by a motor 100. The motor 100 could be positioned inside the inner sleeve.

Figure 23:
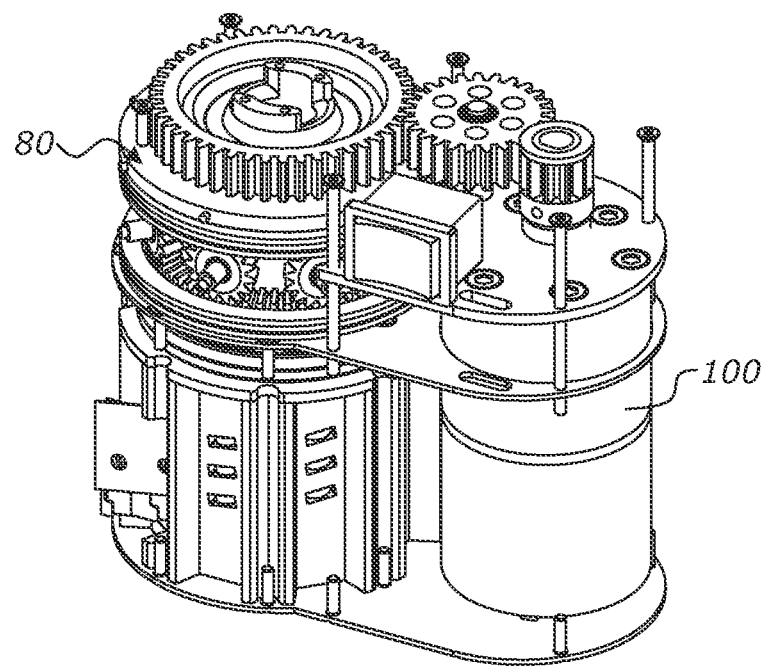
FIG. 23 is a perspective partial cut away view of the actuator of FIG. 22.

In another embodiment the motor 100 is fastened to a frame as seen in FIG. 23.

A large range of options for the drivetrain is available. Choice of drive train is very dependent of the purpose. A motor may be electric, hydraulic or pneumatic. A plurality of motors may be used.

Furthermore storage for the three separate strips may be provided. It may be directly or indirectly be attached to the assembler/disassembler. Preferably the three strips are kept separate to avoid entanglement because of the connector sections (30*a*, 30*b*). In one embodiment the strips are kept on separate spools, in another they are kept loose in a container surrounding the assembler/disassembler. The storage system must be such that the strips can be fed through into and out of the lead-in/lead-out portion at an angle at or close to the helix angle.

In some forms, the tube may be constructed from both ends. It is envisaged that an assembler/disassembler may be provided at opposite ends of the tube and the tube may deploy from each simultaneously or independently.

In some forms a load cell may be incorporated for measuring the axial load on the tube. The load cell may be connected via a controller to the motor to control the speed and direction of the motor. This may be desirable to sence the axial load to prevent the maximum load capacity from being reached. The tube may for example be used for temporarily propping a beam of a building under construction or renovation.

Figure 25:
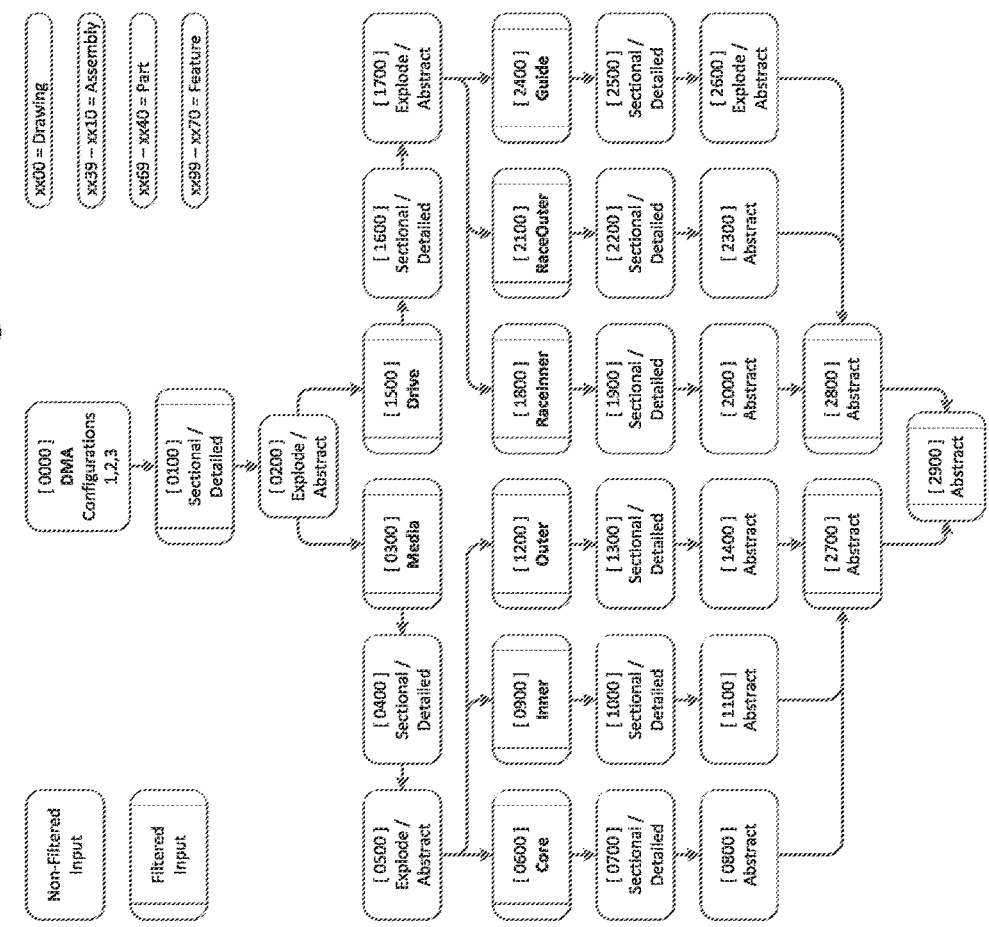
FIG. 25 shows illustrated the design layout of drawings and numbering in rectangular brackets used in the specification.
Figure 24:
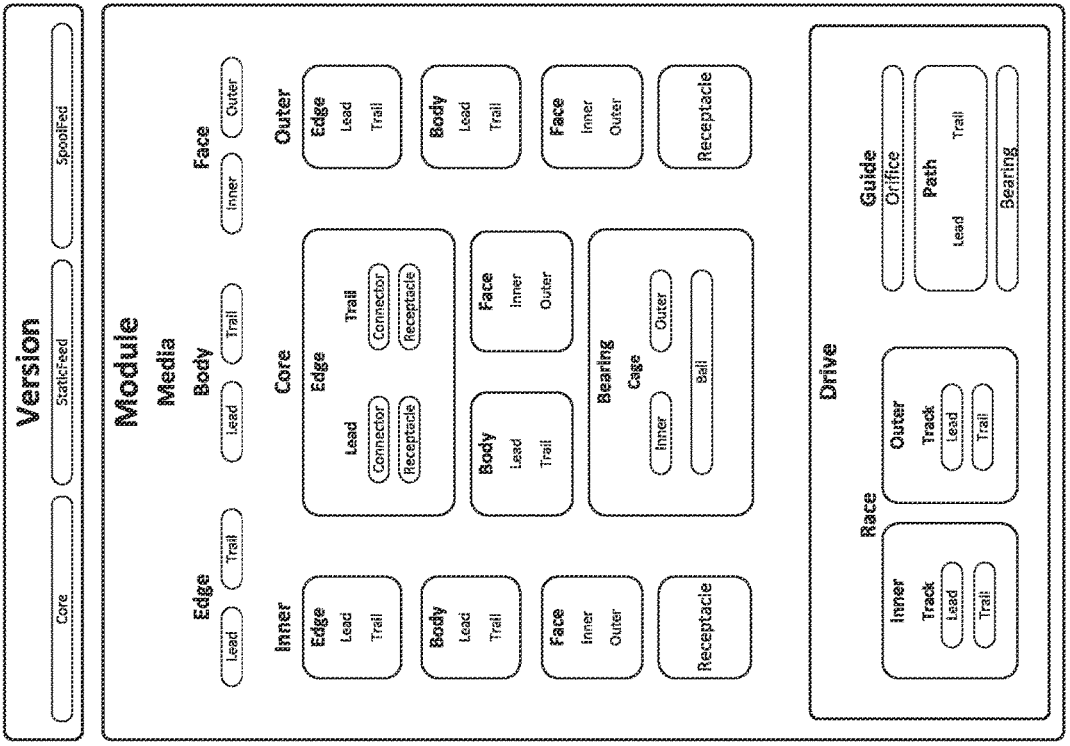
FIG. 24 shows a schema of a design of an actuator of the present invention.

Reference will now be made to the actuator in relation to numbers on the drawings shown in rectangular boxes and in relation to schema of FIG. 24 and drawing index shown in FIG. 25. This is provided to explain component design and layout of an example of the actuator of the present invention. Terminology used in this following section may differ to that used above and in the claims.

Design Hierarchy for the Actuator, Herein Also Referred to as a Dimorphic Media Actuator (DMA)

The Dimorphic Media Actuator (DMA) [0000] herein disclosed consists of Module\Media [0300] and Module\Drive [1500]. Together, they form a type of linear actuator that extends and retracts a tubular column formed by Module\Media. This column may be of virtually any length desired and, in its retracted state, can be stored compactly.

DMA\Version Each Version embodies a Core [0010] unit that transitions DMA\Module\Media [0300] between strip {[0511], [0542], [0543]} and tube [0400] states but may employ a different method for handling DMA\Module\Media in its strip state.

DMA\Version \Core

Though a motor or hand-crank can be installed within DMA\Module\Drive\Race for good package density, It may be more desirable to use this area, in conjunction with the interior of DMA\Module\Media [0470], as a wiring conduit.

DMA\ Version \Spool Fed

Since strips of DMA\Module\Media may be quite long and it is preferably desirable to store them as compactly as possible, a spool surrounding the Core unit is preferable. This configuration also allows for the DMA\Module\Media column [0210] to be extended and retracted without rotation.

DMA\ Version \StaticFeed

As an alternative to Version\SpoolFed, strips of DMA\Module\Media can be fed into a second DMA\Module\Drive to be stored as another column. Insofar as this method implies that DMA\Module\Drive\ Orifice [0270] does not rotate, the DMA\Module\Media column [0210] would therefore be required to rotate as it extends and retracts.

DMA\Module

Though Media [0210] and Drive [0211] may be designed to work together, they need not be strictly coupled. Multiple Media tubes may be dispensed and retrieved sequentially from a single Drive and certain Media designs could be assembled and disassembled without a Drive i.e. by hand. It is therefore worthwhile to consider "Dimorphic Media" and "Dimorphic Media Drive" separately.

DMA\Module\Media

Dimorphic Media can be repeatedly cycled between strip [0374] and tube [0375] forms. The length, diameter, and strength of the tube are design variables that can be set to match an application. What is common to all Media designs is the interface {[0471], [0445]} provided to its Module\Drive [1600] and the method by which it interlocks with itself. This interlock {[0440], [0441], [0442], [0443], [0444]} is accomplished with three separate strips (Core [0600], Inner [0900], Outer [1200]) that are brought together as they are bent along a helical trajectory. Because a compound strip has the same minimum bend radius as its members while benefiting from their combined wall thickness, a greater strength to weight ratio may be achieved with multiple strips.

DMA\Module\Media\Edge

The Lead [0372] of strip-from Module\Media interlocks with the Trail [0373] of tube-form Module\Media.

DMA\Module\Media\Body

In reference to strip-form Module\Media [0374], Lead refers to the strip/tube transition point {[0446], [0447], [0448], [0449], [0450], [0451]} or the direction toward that point. For tube-form Module\Media [0375[ ], Lead refers to the end of the tube [0370]** that is farthest from the strip/tube transition point and the direction toward that end.

DMA\Module\Media\Face

Media\Inner\Face\Inner [1074] forms Inner [0472] while Media\Outer\Face\Outer [1373] forms Outer [0471].

DMA\Module\Media\Core

The Core strip [0600] provides the primary interlock that holds the Module\Media tube [0300] together. It also provides connection points [0512] for the Media\Inner [0900] and Media\Outer [1200] strips and an interface to the Module\Drive [0445].

DMA\Module\Media\Core\Edge

A reciprocal pattern along Lead [0674] forms alternating instances of Lead\Connector [0670] and Lead\Receptacle [0671]. An identical pattern is featured along Trail [0675] forms instances of Trail\Connector [0673] and Trail\Receptacle [0672]. When Media\Core is bent along a helical trajectory bringing its Lead and Trail together {[0447], [0450]}, instances of Lead\Connector mate with instances of Trail\Receptacle In doing so, instances of Trail\Connector mate with instances of Lead\Receptacle. Various shapes of connector/receptacle can be used provided bracing force.

DMA\Module\Media\Core\Body

In reference to strip-form Media\Core, Lead [0676] refers to the strip/tube transition point or the direction toward that point. For tube-form Media\Core, Lead [0678] refers to the end of the tube that is farthest from the strip/tube transition point and the direction toward that end.

The Lead [0678] end is usually cut at an angle such as to form a tube terminus that is perpendicular to the tube axis.

DMA\Module\Media\Core\Face

When Module\Media is in tube-form, Inner [0771] is in direct contact with Media\Inner\Face\Outer [1073] and Outer [0770] is in direct contact with Media\Outer\Face\Inner [1374].

DMA\Module\Media\Core\Bearing

Media\Core features an inline series of Bearing assemblies each composed of a Cage {[0443], [0444]} and a Ball [0445]. Instances of Cage\Inner and Cage\Outer serve as connectors for Media\Inner\Receptacle [1170] and Media\Outer\Receptacle [1470] respectively. Instances of Ball engage with Module\Drive\Race\Inner\Track\Inner [2874] and Module\Drive\Race\Outer\Track\Outer [2871] to grip and propel Module\Media [2900].

DMA\Module\Media\Inner

The primary function of the Inner strip [0900] is to brace the Media\Core interlock along Media\Core\Face\Inner [0771].

DMA\Module\Media\Inner\Edge

Lead and Trail are smooth and continuous and abut with one another {[1071]-[1072]} when Module\Media is in tube-form. Trail braces Media\Core\Face\Inner [0771] along the Media\Core interlock region {[2770]-[2771]} whereas Lead leaves this region exposed {[0449]-[0450]}.

DMA\Module\Media\Inner\Body

In reference to strip-form Media\Inner, Lead [0976] refers to the strip/tube transition point {[0446], [0449]} or the direction toward that point. For tube-form Media\Inner, Lead [0970] refers to the end of the tube that is farthest from the strip/tube transition point and the direction toward that end. The Lead [0970] end is usually cut at an angle such as to form a tube terminus that is perpendicular to the tube axis.

DMA\Module\Media\Inner\Face

When Module\Media is in tube-form, Outer [1073] is in direct contact with Media\Core\Face\Inner [0771].

DMA\Module\Media\Inner\Receptacle

Media\Inner [0900] features an inline series of Receptacle holes [0474] that mate with instances of Media\Core\Bearing\Cage\Inner [0444].

DMA\Module\Media\Outer

The primary function of the Outer strip [1200] is to brace the Media\Core interlock along Media\Core\Face\Outer [0770].

DMA\Module\Media\Outer\Edge

Lead and Trail are smooth and continuous and abut with one another {[1371]-[1372]} when Module\Media is in tube-form. Trail braces Media\Core\Face\Outer along the Media\Core interlock region {[0450]-[0451]} whereas Lead leaves this region exposed {[2770]-[2772]}.

DMA\Module\Media\Outer\Body

In reference to strip-form Media\Outer, Lead [1276] refers to the strip/tube transition point {[0448], [0451]} or the direction toward that point. For tube-form Media\Outer, Lead [1270] refers to the end of the tube that is farthest from the strip/tube transition point and the direction toward that end. The Lead [1270] end is usually cut at an angle such as to form a tube terminus that is perpendicular to the tube axis.

DMA\Module\Media\Outer\Face

When Module\Media is in tube-form, Inner [1374] is in direct contact with Media\Core\Face\Outer [0770]. Within Module\Drive\Guide\Path [2473], Outer [0170] directly contacts instances of Module\Drive\Guide\Bearing [0114].

DMA\Module\Media\Outer\Receptacle

Media\Outer [1200] features an inline series of Receptacle holes [0473] that mate with instances of Media\Core\Bearing\Cage\Outer [0443].

DMA\Module\Drive

Drive bends Module\Media [3000] along its helical Guide\Path [2473] while engaging instances of Module\Media\Core\Bearing\Ball [0743] for hold and propulsion.

DMA\Module\Drive\Race

The Inner [1540] and Outer [1541] Race form a corridor between them through which Module\Media is channeled. A portion of each Module\Media\Core\Bearing\Ball [0445] protrudes beyond Module\Media\Face\Inner [0472] to engage with Inner\Track. Correspondingly, a portion of each Module\Media\Core\Bearing\Ball [0445] extends beyond Module\Media\Face\Outer [0471] to engage with instances of Outer\Track. Intersections of Inner\Track [2970] and Outer\Track [2971] form cavities at which Module\Media\Core\Bearing\Ball instances [2940] are held. These cavities change position as Inner and Outer are rotated in opposite directions relative to one another {[2972], [2937]}, {[2957], [2974]}. Module\Media [0300] is thus propelled through Module Drive [1500].

DMA\Module\Drive\Race\Inner

Assuming that Module\Media\Core\Bearing\Ball [0840] instances occur in a single row (as is usually the case), Inner features a single helical Track [1771] for them to follow.

DMA\Module\Drive\Race\Outer

It is preferable for Outer\Track instances to be of the same helical pitch but of opposite rotational trajectory to that of Race\Inner [1770]. However, other configurations, may work provided Outer is not of identical pitch and rotational trajectory to Race\Inner.

DMA\Module\Drive\Guide

Guide [2400] facilitates the strip-tube transition of Module\Media [0300] via the passive application of inward radial force. The helical bend required to bring Module\Media\Lead [0372] into interlock alignment with Module\Media\Trail [0373] is accomplished by Guide with low friction.

DMA\Module\Drive\Guide\Orifice

Serving as an interface between DMA\Version\Core [0010] and its storage apparatus, Orifice [2470] channels Module\Media into and out of Drive\Guide [2400].

DMA\Module\Drive\Guide\Path

In practice, Module\Media interlock and dis-interlock result from a slight relaxation of forces applied by Drive\Guide [2400]. To accomplish this, Path [2473] is set to a slightly smaller radius than is natural to the fully formed Module\Media column [0210].

DMA\Module\Drive\Guide\Bearing

In the interest of efficiency, typical Guide\Path [2473] designs implement a Bearing array [1711] to reduce friction between it and Module\Media\Face\Outer {[0114], [0170]}. Deep-groove bearings at a suitable orientation [2541] work well as would many other forms of friction management.

The following is a summary of the features described in this section and in the drawings shown in square brackets:

[0000] DMA
[0010] DMA\Version\Core
[0011] DMA\Version\StaticFeed
[0100] DMA
[0170] DMA\Module\Media\Outer\Face\Outer
[0200] DMA\Module
[0210] DMA\Module\Media
[0211] DMA\Module\Drive
[0270] DMA\Module\Drive\Guide\Orifice
[0300] DMA\Module\Media
[0370] DMA\Module\Media\Body\Lead
[0371] DMA\Module\Media\Body\Trail

[0372] DMA\Module\Media\Edge\Lead
[0373] DMA\Module\Media\Edge\Trail
[0374] DMA\Module\Media\Strip
[0375] DMA\Module\Media\Tube
[0400] DMA\Module\Media
[0410] DMA\Module\Media\Cap
[0440] DMA\Module\Media\Outer
[0441] DMA\Module\Media\Core
[0442] DMA\Module\Media\Inner
[0443] DMA\Module\Media\Core\Bearing\Cage\Outer
[0444] DMA\Module\Media\Core\Bearing\Cage\Inner
[0445] DMA\Module\Media\Core\Bearing\Ball
[0446] DMA\Module\Media\Inner\Edge\Trail
[0447] DMA\Module\Media\Core\Edge\Trail
[0448] DMA\Module\Media\Outer\Edge\Trail
[0449] DMA\Module\Media\Inner\Edge\Lead
[0450] DMA\Module\Media\Core\Edge\Lead
[0451] DMA\Module\Media\Outer\Edge\Lead
[0452] DMA\Module\Media\Outer
[0453] DMA\Module\Media\Core
[0454] DMA\Module\Media\Inner
[0470] DMA\Module\Media\Interior
[0471] DMA\Module\Media\Face\Outer
[0472] DMA\Module\Media\Face\Inner
[0473] DMA\Module\Media\Outer\Receptacle
[0474] DMA\Module\Media\Inner\Receptacle
[0500] DMA\Module\Media
[0510] DMA\Module\Media\Core
[0511] DMA\Module\Media\Core
[0512] DMA\Module\Media\Core\Bearing
[0540] DMA\Module\Media\Inner
[0541] DMA\Module\Media\Outer
[0542] DMA\Module\Media\Inner
[0543] DMA\Module\Media\Outer
[0600] DMA\Module\Media\Core
[0610] DMA\Module\Media\Core
[0611] DMA\Module\Media\Core\Bearing
[0670] DMA\Module\Media\Core\Edge\Lead\Connector
[0671] DMA\Module\Media\Core\Edge\Lead\Receptacle
[0672] DMA\Module\Media\Core\Edge\Trail\Receptacle
[0673] DMA\Module\Media\Core\Edge\Trail\Connector
[0674] DMA\Module\Media\Core\Edge\Lead
[0675] DMA\Module\Media\Core\Edge\Trail
[0676] DMA\Module\Media\Core\Body\Lead
[0677] DMA\Module\Media\Core\Body\Trail
[0678] DMA\Module\Media\Core\Body\Lead
[0679] DMA\Module\Media\Core\Body\Trail
[0700] DMA\Module\Media\Core
[0740] DMA\Module\Media\Core\Bearing\Cage\Outer
[0741] DMA\Module\Media\Core
[0742] DMA\Module\Media\Core\Bearing\Cage\Inner
[0743] DMA\Module\Media\Core\Bearing\Ball
[0770] DMA\Module\Media\Core\Face\Outer
[0771] DMA\Module\Media\Core\Face\Inner
[0800] DMA\Module\Media\Core
[0840] DMA\Module\Media\Core\Bearing\Ball
[0900] DMA\Module\Media\Inner
[0970] DMA\Module\Media\Inner\Body\Lead
[0971] DMA\Module\Media\Inner\Body\Trail
[0972] DMA\Module\Media\Inner\Edge\Lead
[0973] DMA\Module\Media\Inner\Edge\Trail
[0974] DMA\Module\Media\Inner\Receptacle
[0975] DMA\Module\Media\Inner\Body\Lead
[0976] DMA\Module\Media\Inner\Body\Trail
[1000] DMA\Module\Media\Inner\
[1070] DMA\Module\Media\Inner\Receptacle
[1071] DMA\Module\Media\Inner\Edge\Lead
[1072] DMA\Module\Media\Inner\Edge\Trail
[1073] DMA\Module\Media\Inner\Face\Outer
[1074] DMA\Module\Media\Inner\Face\Inner
[1100] DMA\Module\Media\Inner
[1170] DMA\Module\Media\Inner\Receptacle
[1171] DMA\Module\Media\Inner\Edge\Lead
[1172] DMA\Module\Media\Inner\Edge\Trail
[1200] DMA\Module\Media\Outer
[1240] DMA\Module\Media\Outer
[1241] DMA\Module\Media\Outer
[1270] DMA\Module\Media\Outer\Body\Lead
[1271] DMA\Module\Media\Outer\Body\Trail
[1272] DMA\Module\Media\Outer\Edge\Lead
[1273] DMA\Module\Media\Outer\Edge\Trail
[1274] DMA\Module\Media\Outer\Receptacle
[1275] DMA\Module\Media\Outer\Body\Lead
[1276] DMA\Module\Media\Outer\Body\Trail
[1300] DMA\Module\Media\Outer
[1370] DMA\Module\Media\Outer\Receptacle
[1371] DMA\Module\Media\Outer\Edge\Lead
[1372] DMA\Module\Media\Outer\Edge\Trail
[1373] DMA\Module\Media\Outer\Face\Outer
[1374] DMA\Module\Media\Outer\Face\Inner
[1400] DMA\Module\Media\Outer
[1470] DMA\Module\Media\Outer\Receptacle
[1471] DMA\Module\Media\Outer\Edge\Lead
[1472] DMA\Module\Media\Outer\Edge\Trail
[1500] DMA\Module\Drive
[1510] DMA\Module\Drive\Guide
[1540] DMA\Module\Drive\Race\Inner
[1541] DMA\Module\Drive\Race\Outer
[1600] DMA\Module\Drive
[1700] DMA\Module\Drive
[1710] DMA\Module\Drive\Guide
[1711] DMA\Module\Drive\Guide\Bearing
[1740] DMA\Module\Drive\Race\Outer
[1741] DMA\Module\Drive\Race\Inner
[1770] DMA\Module\Drive\Race\Outer\Track
[1771] DMA\Module\Drive\Race\Inner\Track
[1800] DMA\Module\Drive\Race\Inner
[1870] DMA\Module\Drive\Race\Inner\Track
[1871] DMA\Module\Drive\Race\Inner\Track\Lead
[1872] DMA\Module\Drive\Race\Inner\Track\Trail
[1900] DMA\Module\Drive\Race\Inner
[1970] DMA\Module\Drive\Race\Inner\Track
[1971] DMA\Module\Drive\Race\Inner\Mount
[2000] DMA\Module\Drive\Race\Inner
[2070] DMA\Module\Drive\Race\Inner\Track
[2100] DMA\Module\Drive\Race\Outer
[2170] DMA\Module\Drive\Race\Outer\Track
[2200] DMA\Module\Drive\Race\Outer
[2270] DMA\Module\Drive\Race\Outer\Track\Lead
[2271] DMA\Module\Drive\Race\Outer\Track\Trail
[2272] DMA\Module\Drive\Race\Outer\Track
[2273] DMA\Module\Drive\Race\Outer\Mount
[2300] DMA\Module\Drive\Race\Outer
[2370] DMA\Module\Drive\Race\Outer\Track\Lead
[2371] DMA\Module\Drive\Race\Outer\Track\Trail
[2400] DMA\Module\Drive\Guide
[2440] DMA\Module\Drive\Guide\Path\Bearing
[2470] DMA\Module\Drive\Guide\Orifice
[2471] DMA\Module\Drive\Guide\Path\Lead
[2472] DMA\Module\Drive\Guide\Path\Trail
[2473] DMA\Module\Drive\Guide\Path
[2500] DMA\Module\Drive\Guide
[2540] DMA\Module\Drive\Guide\Path\Bearing
[2541] DMA\Module\Drive\Guide\Path\Bearing

[2570] DMA\Module\Drive\Guide\Mount
[2600] DMA\Module\Drive\Guide
[2700] DMA\Module\Media
[2710] DMA\Module\Media
[2740] DMA\Module\Media\Outer
[2741] DMA\Module\Media\Core\Bearing\Cage\Outer
[2742] DMA\Module\Media\Core\Bearing\Ball
[2743] DMA\Module\Media\Core
[2744] DMA\Module\Media\Core\Bearing\Cage\Inner
[2745] DMA\Module\Media\Inner
[2770] DMA\Module\Media\Core\Edge\Trail
[2771] DMA\Module\Media\Inner\Edge\Trail
[2272] DMA\Module\Media\Outer\Edge\Trail
[2800] DMA\Module\
[2900] DMA
[2910] DMA\Module\Media
[2940] DMA\Module\Media\Core\Bearing\Ball
[2970] DMA\Module\Drive\Race\Inner\Track
[2971] DMA\Module\Drive\Race\Outer\Track
[2972] DMA\Module\Drive\Race\Inner\Track
[2973] DMA\Module\Drive\Race\Outer\Track
[2974] DMA\Module\Drive\Race\Inner\Track
[2975] DMA\Module\Drive\Race\Outer\Track
[3000] DMA\Schema
[3100] DMA\Drawings

ADVANTAGES

Though it is possible to incorporate all necessary features into a single strip, the minimum bend radius that a single strip having desired load capacity could achieve before folding would be limited in proportion to the wall thickness. Because a compound wall has the same minimum bend radius as its individual strips while benefiting from the same or similar characteristics of their combined wall thickness, a greater strength to diameter ratio can be achieved with multiple strips.

The invention claimed is:

1. An extendable tube comprising:
    a strip that is core strip able to be caused to progressively deploy from an at least substantially stowed format and into, or undeploy to its at least substantially stowed format from, a helical tubular form,
    an outer strip able to be caused, as the core strip deploys or undeploys, to progressively deploy from an at least substantially stowed format and into a helical tubular form, or undeploy to its at least substantially stowed format from, a helical tubular form about the tubular form of the core strip when the outer strip is deployed to anchor with said core strip and lay over and about one edge to edge contact or proximate region of the core strip of the tubular form of the core strip, and
    an inner strip able to be caused, as the core strip deploys or undeploys, to progressively deploy from an at least substantially stowed format and into, or undeploy to its at least substantially stowed format from, a helical tubular form within the tubular form of the core strip and when the inner strip is deployed to anchor with said core strip and to lay over and within the other edge to edge contact or proximate region of the core strip of the tubular form of the core strip,
    wherein, the core strip is in direct overlay contact with the inner strip when in their tubular form and the outer strip is in direct overlay contact with the core strip when in their tubular form.

2. The extendable tube of claim 1 wherein the inner and/or outer strip progressively during deployment, anchor to the core strip and during undeployment de-anchor from the core strip.

3. The extendable tube of claim 1 wherein the core strip contacts edge to edge upon deployment into the helical form.

4. The extendable tube of claim 3 wherein the edge to edge contact of the core strip is of straight edges of the core strip.

5. The extendable tube of claim 3 wherein the edge to edge contact of the core strip is an interlacing contact.

6. The extendable tube of claim 1 wherein all strips to deploy or undeploy come from or return to a common assembler/disassembler via which the strips transition between their stored and deployed state and during transition to be deployed through the assembler/disassembler are caused to assume the helical tubular forms by said assembler/disassembler.

7. The extendable tube of claim 1 wherein all strips to deploy are in a spool form.

8. The extendable tube of claim 1 wherein all strips to deploy are in a spool form separate from each other.

9. The extendable tube of claim 1 wherein the strip deployment is by an assembler/disassembler via which the strips transition from their stored state to their deployed state.

10. The extendable tube of claim 1 wherein the tubular forms rotate during deployment/undeployment.

11. The extendable tube of claim 1 wherein the tubular forms do not rotate during deployment/undeployment.

12. The extendable tube of claim 1 wherein there is edgewise contact of the outer strip on itself when in the deployed state.

13. The extendable tube of claim 1 wherein there is edgewise contact of the inner strip on itself when in the deployed state.

14. The extendable tube of claim 13 wherein the core strip carries a plurality of spaced apart protrusions to anchor with the outer and/or inner strips.

15. The extendable tube of claim 14 wherein the protrusions are in a row of said protrusions extending along the core strip and projecting from one or both major faces of the core strip and are each to engage into a complimentary shaped hole of a row of holes of one or each of the outer and/or inner strips to anchor the outer and/or inner strips with the core strip.

16. An extendable tube able to be assembled to a tubular form and disassembled to a non-tubular stored condition, the tube comprising of three flexible strips namely:
    a core strip able to be wound from the stored condition into and back from a tubular helical form and having a leading and trailing edge at where complementary shaped connector sections present a row of identical connector shapes so that the leading edge of one winding of the tubular helical form of the core strip can key with the trailing edge of an adjacent winding of the tubular helical form of the core strip in a leading to trailing edge abutting manner, the core strip carrying a row of protrusions extending orthogonally from one or both major faces of the core strip,
    an inner strip of width equal to the width to the core strip able to be wound from a stored condition together with the core strip into and back from a helical tubular form inside of and against the core strip and comprising a row of holes for mating with the protrusions of the core strip, an outer strip preferably of a width equal to the width of the core strip able to be wound from a stored condition together with the core strip into and back from a helical tubular form outside of and against the core strip and comprising a row of holes for mating with the protrusions of the core strip, and wherein when assembled:

the inner strip is presented at the trailing edge of the core strip in a manner to prevent the connector formations of the leading edge of an adjacent winding of the core strip that are engaged with the connector formations of the core strip at the trailing edge of the core strip from moving radially inwardly of the tubular helical form, and the outer strip is presented at the leading edge of the core strip in a manner to prevent the connector formations of the trailing edge of an adjacent winding of the core strip that are engaged with the connector formations of the core strip at the leading edge of the core strip from moving radially outwardly of the tubular helical form.

17. An extendable tube able to be assembled to a tubular form and disassembled to a non-tubular stored condition, the tube comprising of three flexible strips namely:

a core strip able to be wound from the stored condition into and back from a tubular helical form and having a leading and trailing edge at where complementary shaped connector sections present a row of identical connector shapes so that the leading edge of one winding of the tubular helical form of the core strip can key with the trailing edge of an adjacent winding of the tubular helical form of the core strip in a leading to trailing edge abutting manner, the core strip carrying a row of protrusions extending orthogonally from both major faces of the core strip, an inner strip preferably of width equal to a width to the core strip able to be wound from a stored condition together with the core strip into and back from a helical tubular form inside of and against the core strip and comprising a row of holes for mating with the protrusions of the core strip, an outer strip preferably of a width equal to the width of the core strip able to be wound from a stored condition together with the core strip into and back from a helical tubular form outside of and against the core strip and comprising a row of holes for mating with the protrusions of the core strip, and wherein when assembled:

the inner strip is presented at the leading edge of the core strip in a manner to prevent the connector formations of the trailing edge of an adjacent winding of the core strip that are engaged with the connector formations of the core strip at the leading edge of the core strip from moving radially inwardly of the tubular helical form, and the outer strip is presented at the trailing edge of the core strip in a manner to prevent the connector formations of the leading edge of an adjacent winding of the core strip that are engaged with the connector formations of the core strip at the trailing edge of the core strip from moving radially outwardly of the tubular helical form.

* * * * *